(12) United States Patent
Sakai

(10) Patent No.: US 7,363,097 B2
(45) Date of Patent: Apr. 22, 2008

(54) AUTOMATIC DESIGN APPARATUS, AUTOMATIC DESIGN METHOD, AND AUTOMATIC DESIGN PROGRAM OF DIGITAL CIRCUIT

(75) Inventor: Yoshisato Sakai, Shinagawa-Ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 11/389,084

(22) Filed: Mar. 27, 2006

(65) Prior Publication Data

US 2007/0179639 A1 Aug. 2, 2007

(30) Foreign Application Priority Data

Jan. 31, 2006 (JP) ............. 2006-023212

(51) Int. Cl.
*G06F 19/00* (2006.01)
*G06F 17/50* (2006.01)
*G06F 7/62* (2006.01)

(52) U.S. Cl. ............. 700/97; 700/121; 703/1; 703/13; 703/14; 716/1; 716/4

(58) Field of Classification Search ............ 700/97, 700/121; 703/1, 13–14; 716/1, 4
See application file for complete search history.

(56) References Cited

U.S. PATENT DOCUMENTS

| | | | | |
|---|---|---|---|---|
| 5,623,418 A | * | 4/1997 | Rostoker et al. | 716/1 |
| 5,696,771 A | * | 12/1997 | Beausang et al. | 714/726 |
| 6,182,268 B1 | * | 1/2001 | McElvain | 716/1 |
| 6,324,679 B1 | * | 11/2001 | Raghunathan et al. | 716/18 |
| 6,378,123 B1 | * | 4/2002 | Dupenloup | 716/18 |
| 6,477,683 B1 | * | 11/2002 | Killian et al. | 716/1 |
| 6,487,704 B1 | * | 11/2002 | McNamara et al. | 716/5 |

(Continued)

FOREIGN PATENT DOCUMENTS

JP 3600420 9/2004

OTHER PUBLICATIONS

Sunil P. Khatri, et al., "Engineering Change in a Non-Deterministic FSM Setting", Proceedings of the 33rd Annual Conference on Design Automation, ISBN: 0-89791-779-0, 1996. pp. 451-456.

(Continued)

*Primary Examiner*—Ronald Hartman, Jr.
(74) *Attorney, Agent, or Firm*—Oblon, Spivak, McClelland, Maier & Neustadt, P.C.

(57) ABSTRACT

An automatic digital-circuit design apparatus receives a control target model written in a design description language, generates a control target model represented by a finite state machine model, stores the generated control target model, receives a control specification model written in a design description language, generates a control specification model represented by a finite state machine model, stores the generated control specification model, generates a control apparatus synthesis model by composing the generated control target model and the generated control specification model, computes controllable simulation relation, stores the computed controllable simulation relation, determines whether the control apparatus synthesis model is a model capable of providing the control, generates a permissible operation model, stores the generated permissible operation model, determines a control rule, generates a control apparatus model represented by a finite state machine, and converts the control apparatus model to a control apparatus model written in a design description language.

13 Claims, 24 Drawing Sheets

U.S. PATENT DOCUMENTS

| | | | |
|---|---|---|---|
| 6,536,012 B1* | 3/2003 | Mizuno | 716/1 |
| 6,581,191 B1* | 6/2003 | Schubert et al. | 716/4 |
| 6,618,839 B1* | 9/2003 | Beardslee et al. | 716/4 |
| 6,760,888 B2* | 7/2004 | Killian et al. | 716/1 |
| 6,816,825 B1* | 11/2004 | Ashar et al. | 703/14 |
| 6,829,753 B2* | 12/2004 | Lee et al. | 716/5 |
| 6,904,397 B1* | 6/2005 | Fields et al. | 703/14 |
| 7,139,985 B2* | 11/2006 | Jones | 716/1 |
| 7,222,315 B2* | 5/2007 | Schubert et al. | 716/4 |
| 7,246,331 B2* | 7/2007 | Ward | 716/4 |
| 2003/0069724 A1* | 4/2003 | Schubert et al. | 703/16 |
| 2003/0131325 A1* | 7/2003 | Schubert et al. | 716/4 |
| 2003/0182642 A1* | 9/2003 | Schubert et al. | 716/4 |
| 2003/0208723 A1* | 11/2003 | Killian et al. | 716/1 |
| 2004/0025122 A1* | 2/2004 | Schubert et al. | 716/4 |
| 2005/0005250 A1* | 1/2005 | Jones | 716/1 |
| 2005/0034090 A1* | 2/2005 | Sato et al. | 716/6 |
| 2005/0055657 A1* | 3/2005 | Jones | 716/18 |
| 2005/0125754 A1* | 6/2005 | Schubert et al. | 716/5 |
| 2006/0085782 A1* | 4/2006 | Ward | 716/18 |
| 2006/0282813 A1* | 12/2006 | Jones | 716/18 |
| 2007/0005321 A1* | 1/2007 | Alfieri | 703/14 |
| 2007/0089075 A1* | 4/2007 | Ward | 716/4 |
| 2007/0150845 A1* | 6/2007 | Matsuura | 716/4 |
| 2007/0198959 A1* | 8/2007 | Schubert et al. | 716/4 |

OTHER PUBLICATIONS

Hiromi Hiraishi, et al., "Formal Verification Methods based on Logic Function Manipulation", Journal of Information Processing Society of Japan, vol. 35, No. 8, Aug. 1994, pp. 710-718.

Edmund M. Clarke, et al., "Model Checking", MIT Press, ISBN: 0-262-03270-8, 2000, pp. 86-95, 180-185, and 3 cover pages.

* cited by examiner

```
1  module control_system(clk, rst, v, y);
2      input clk, rst;
3      input v;
4      output y;
5      wire u;
6
7      plant p(clk, rst, u, y);
8      controller c(clk, rst, v, y, u);
9
10 endmodule
```

```
1  module controller(clk, rst, v, y, u);
2      input clk, rst;
3      input v;
4      input y;
5      output u;
6
7      /* not implemented */
8
9  endmodule
```

```
1  module spec(clk, rst, v, y);
2
3  input clk, rst, v;
4  output y;
5
6  reg x0, x1;
7
8  always @(posedge clk or posedge rst)
9    if(rst)
10     x0 <= 0;
11   else
12     x0 <= v;
13
14 always @(posedge clk or posedge rst)
15   if(rst)
16     x1 <= 0;
17   else
18     x1 <= x0;
19
20 assign y =x0 & x1;
21
22 endmodule
```

TRANSITION RELATION
| INPUT AND OUTPUT | | FLIP-FLOP | |
|---|---|---|---|
| | | CURRENT STATE | NEXT STATE |
| v | y | x1  x0 | x1'  x0' |
| 0 | 0 | 0  0 | 0  0 |
| 1 | 0 | 0  0 | 0  1 |
| 0 | 0 | 0  1 | 1  0 |
| 1 | 0 | 0  1 | 1  1 |
| 0 | 0 | 1  0 | 0  0 |
| 1 | 0 | 1  0 | 0  1 |
| 0 | 1 | 1  1 | 1  0 |
| 1 | 1 | 1  1 | 1  1 |
FIG. 6A
INITIAL STATE
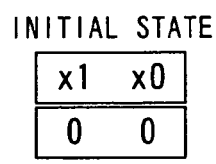
FIG. 6B
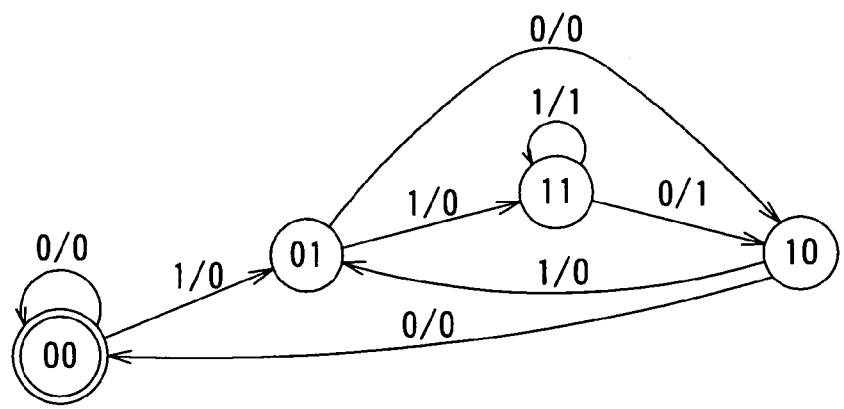
FIG. 7

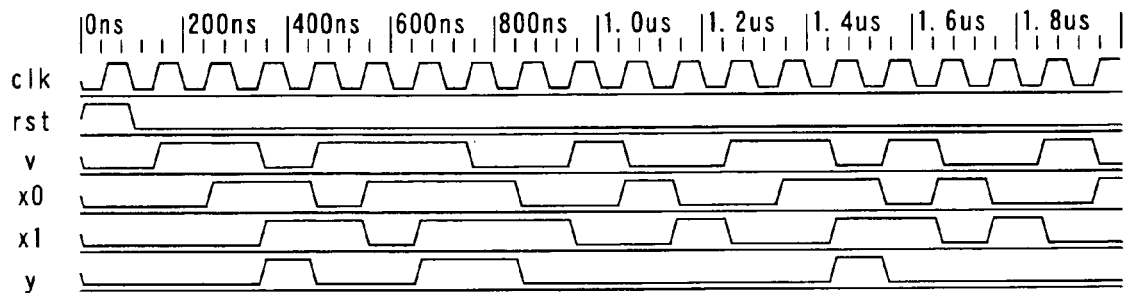
FIG. 8
```
1  module plant(clk, rst, u, y);
2      input  clk, rst;
3      input  u;
4      output y;
5      reg    s;
6
7      assign y =s;
8      always @(posedge clk or posedge rst)
9        if (rst)
10         s <= 0;
11       else
12         s <= s ^ u;
13
14 endmodule
```
FIG. 9A
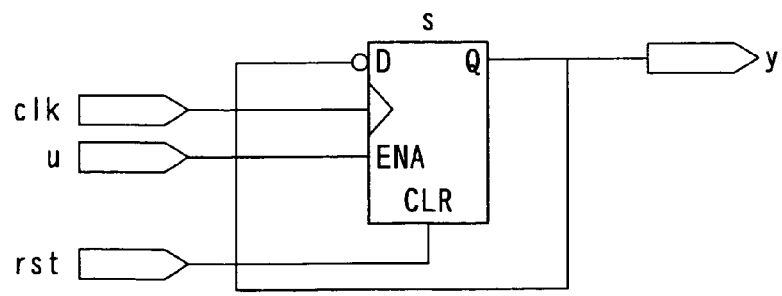
FIG. 9B TRANSITION RELATION
| INPUT AND OUTPUT u y | CURRENT STATE s | NEXT STATE s' |
|---|---|---|
| 0 0 | 0 | 0 |
| 1 0 | 0 | 1 |
| 0 1 | 1 | 1 |
| 1 1 | 1 | 0 |
FIG. 10A
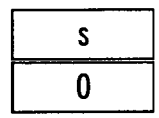
FIG. 10B
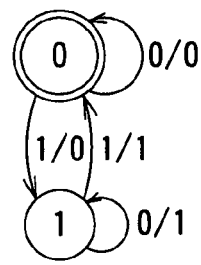
FIG. 11
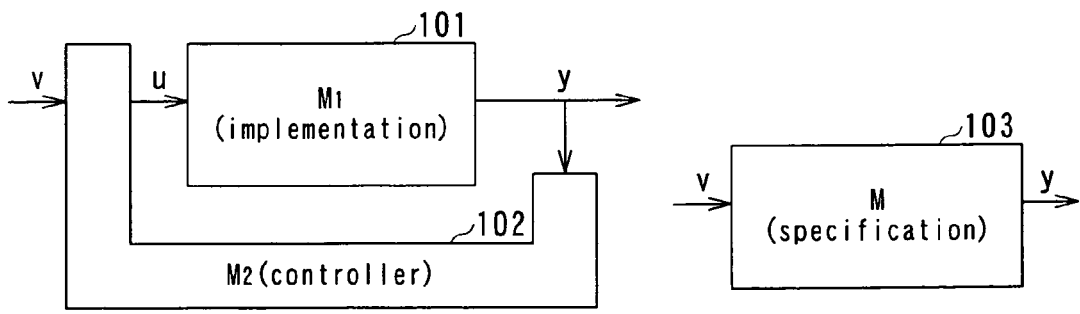
FIG. 12A          FIG. 12B

CONTROLLABLE SIMULATION RELATION

| s | x0 | x1 |
|---|----|----|
| 0 | 0  | 0  |
| 0 | 0  | 1  |
| 0 | 1  | 0  |
| 1 | 1  | 1  |

FIG. 13

PERMISSIBLE OPERATION MODEL (TRANSITION RELATION)

| INPUT AND OUTPUT | | | CURRENT STATE | | | NEXT STATE | | |
|---|---|---|---|---|---|---|---|---|
| u | v | y | s | x0 | x1 | s' | x0' | x1' |
| 0 | 0 | 0 | 0 | 0 | 0 | 0 | 0 | 0 |
| 0 | 0 | 0 | 0 | 0 | 1 | 0 | 0 | 0 |
| 0 | 0 | 0 | 0 | 1 | 0 | 0 | 0 | 1 |
| 0 | 1 | 0 | 0 | 0 | 0 | 0 | 1 | 0 |
| 0 | 1 | 0 | 0 | 0 | 1 | 0 | 1 | 0 |
| 0 | 1 | 1 | 1 | 1 | 1 | 1 | 1 | 1 |
| 1 | 0 | 1 | 1 | 1 | 1 | 0 | 0 | 1 |
| 1 | 1 | 0 | 0 | 1 | 0 | 1 | 1 | 1 |

FIG. 14A

INITIAL STATE

| s | x0 | x1 |
|---|----|----|
| 0 | 0  | 0  |

FIG. 14B

CONTROL RULE

| u | v | s | x0 | x1 |
|---|---|---|----|----|
| 0 | 0 | 0 | 0  | 0  |
| 0 | 0 | 0 | 0  | 1  |
| 0 | 0 | 0 | 1  | 0  |
| 0 | 1 | 0 | 0  | 0  |
| 0 | 1 | 0 | 0  | 1  |
| 0 | 1 | 1 | 1  | 1  |
| 1 | 0 | 1 | 1  | 1  |
| 1 | 1 | 0 | 1  | 0  |

FIG. 15

TRANSITION RELATION

| INPUT AND OUTPUT | | | CURRENT STATE | | | NEXT STATE | | |
| u | v | y | s | x0 | x1 | s' | x0' | x1' |
|---|---|---|---|----|----|----|-----|-----|
| 0 | 0 | 0 | 0 | 0  | 0  | 0  | 0   | 0   |
| 0 | 0 | 0 | 0 | 0  | 1  | 0  | 0   | 0   |
| 0 | 0 | 0 | 0 | 1  | 0  | 0  | 0   | 1   |
| 0 | 1 | 0 | 0 | 0  | 0  | 0  | 1   | 0   |
| 0 | 1 | 0 | 0 | 0  | 1  | 0  | 1   | 0   |
| 0 | 1 | 1 | 1 | 1  | 1  | 1  | 1   | 1   |
| 1 | 0 | 1 | 1 | 1  | 1  | 0  | 0   | 1   |
| 1 | 1 | 0 | 0 | 1  | 0  | 1  | 1   | 1   |

FIG. 16A

INITIAL STATE

| s | x0 | x1 |
|---|----|----|
| 0 | 0  | 0  |

FIG. 16B

```verilog
module controller(clk, rst, v, y, u);
    input clk, rst;
    input v;
    input y;
    output u;

reg s, x0, x1;

always @(posedge clk or posedge rst)
      if (rst)
        s <= 0;
      else
        s <= s ^ u;

always @(posedge clk or posedge rst)
      if (rst)
        x0 <= 0;
      else
        x0 <= v;

always @(posedge clk or posedge rst)
      if (rst)
        x1 <= 0;
      else
        x1 <= x0;

assign u = ({v, s, x0, x1}== 4'b0000)?1'b0:
              ({v, s, x0, x1}== 4'b0001)?1'b0:
              ({v, s, x0, x1}== 4'b0010)?1'b0:
              ({v, s, x0, x1}== 4'b1000)?1'b0:
              ({v, s, x0, x1}== 4'b1001)?1'b0:
              ({v, s, x0, x1}== 4'b1111)?1'b0:
              ({v, s, x0, x1}== 4'b0111)?1'b1:
              ({v, s, x0, x1}== 4'b1010)?1'b1:
              1'bx;

endmodule
```

FIG. 17

```
1  module controller(clk, rst, v, y, u);
2      input clk, rst;
3      input v;
4      input y;
5      output u;
6
7      reg s, x0;
8
9      always @(posedge clk or posedge rst)
10       if (rst)
11         s <= 0;
12       else
13         s <= v & x0;
14
15     always @(posedge clk or posedge rst)
16       if (rst)
17         x0 <= 0;
18       else
19         x0 <= v;
20
21     assign u =(v & x0)^s;
22
23 endmodule
```

```
1  vunit (control_system) {
2    default clock = (posedge clk);
3    assert always v <-> next (next y);
4  }
```

FIG. 21

| ELEMENTARY SUBFORMULA | TYPE | PROPOSITION SYMBOL | CURRENT STATE VARIABLE | NEXT STATE VARIABLE |
|---|---|---|---|---|
| v | ATOMIC PROPOSITION | v | v | v' |
| y | ATOMIC PROPOSITION | y | y | y' |
| XXy | NEXT TIME SUBFORMULA | x0 | x0 | x0' |
| Xy | NEXT TIME SUBFORMULA | x1 | x1 | x1' |
| XG(v⇔XXy) | NEXT TIME SUBFORMULA | tg | tg | tg' |

FIG. 22

TRANSITION RELATION

| CURRENT STATE | | | NEXT STATE | | | | |
|---|---|---|---|---|---|---|---|
| tg | tx0 | tx1 | tg' | tx0' | tx1' | v' | y' |
| 0 | 0 | 0 | 0 | 0 | 0 | 0 | 0 |
| 0 | 0 | 0 | 0 | 0 | 0 | 1 | 0 |
| 0 | 0 | 0 | 0 | 1 | 0 | 0 | 0 |
| 0 | 0 | 0 | 0 | 1 | 0 | 1 | 0 |
| 0 | 0 | 0 | 1 | 0 | 0 | 1 | 0 |
| 0 | 0 | 0 | 1 | 1 | 0 | 0 | 0 |
| 0 | 0 | 1 | 0 | 0 | 0 | 0 | 1 |
| 0 | 0 | 1 | 0 | 0 | 0 | 1 | 1 |
| 0 | 0 | 1 | 0 | 1 | 0 | 0 | 1 |
| 0 | 0 | 1 | 0 | 1 | 0 | 1 | 1 |
| 0 | 0 | 1 | 1 | 0 | 0 | 1 | 1 |
| 0 | 0 | 1 | 1 | 1 | 0 | 0 | 1 |
| 0 | 1 | 0 | 0 | 0 | 1 | 0 | 0 |
| 0 | 1 | 0 | 0 | 0 | 1 | 1 | 0 |
| 0 | 1 | 0 | 0 | 1 | 1 | 0 | 0 |
| 0 | 1 | 0 | 0 | 1 | 1 | 1 | 0 |
| 0 | 1 | 0 | 1 | 0 | 1 | 1 | 0 |
| 0 | 1 | 0 | 1 | 1 | 1 | 0 | 0 |
| 0 | 1 | 1 | 0 | 0 | 1 | 0 | 1 |
| 0 | 1 | 1 | 0 | 0 | 1 | 1 | 1 |
| 0 | 1 | 1 | 0 | 1 | 1 | 0 | 1 |
| 0 | 1 | 1 | 0 | 1 | 1 | 1 | 1 |
| 0 | 1 | 1 | 1 | 0 | 1 | 1 | 1 |
| 0 | 1 | 1 | 1 | 1 | 1 | 0 | 1 |
| 1 | 0 | 0 | 1 | 0 | 0 | 0 | 0 |
| 1 | 0 | 0 | 1 | 1 | 0 | 1 | 0 |
| 1 | 0 | 1 | 1 | 0 | 0 | 0 | 1 |
| 1 | 0 | 1 | 1 | 1 | 0 | 1 | 1 |
| 1 | 1 | 0 | 1 | 0 | 1 | 0 | 0 |
| 1 | 1 | 0 | 1 | 1 | 1 | 1 | 0 |
| 1 | 1 | 1 | 1 | 0 | 1 | 0 | 1 |
| 1 | 1 | 1 | 1 | 1 | 1 | 1 | 1 |

FIG. 23

SET OF INITIAL STATES

| tg | tx0 | tx1 | v | y |
|---|---|---|---|---|
| 1 | 0 | 0 | 0 | 0 |
| 1 | 0 | 1 | 0 | 0 |
| 1 | 1 | 0 | 1 | 1 |
| 1 | 1 | 1 | 1 | 1 |

FIG. 24

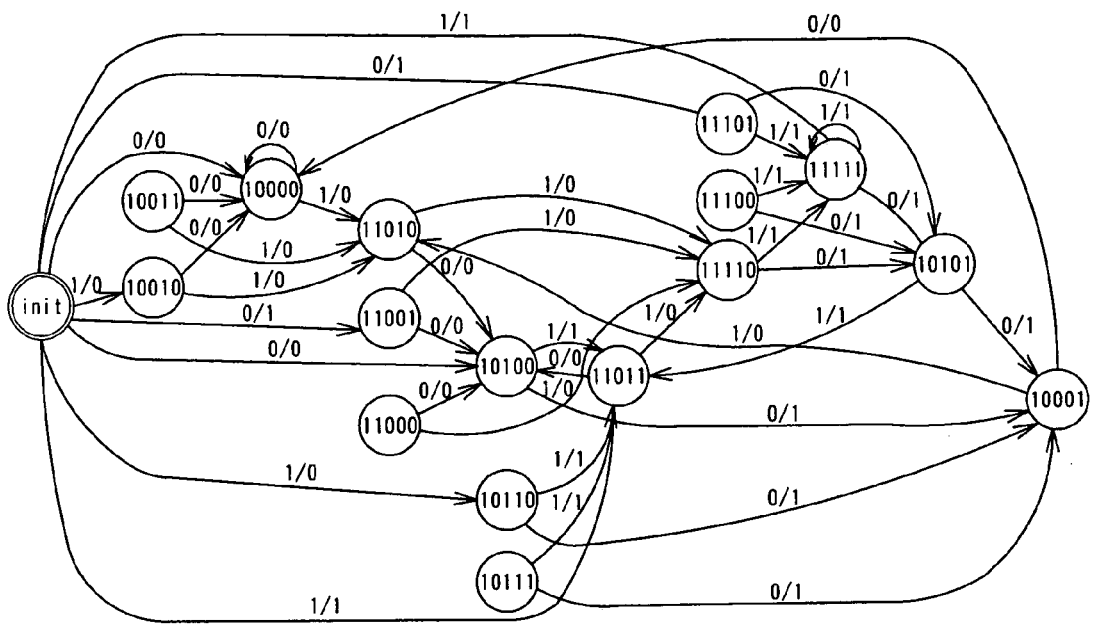
F I G. 27
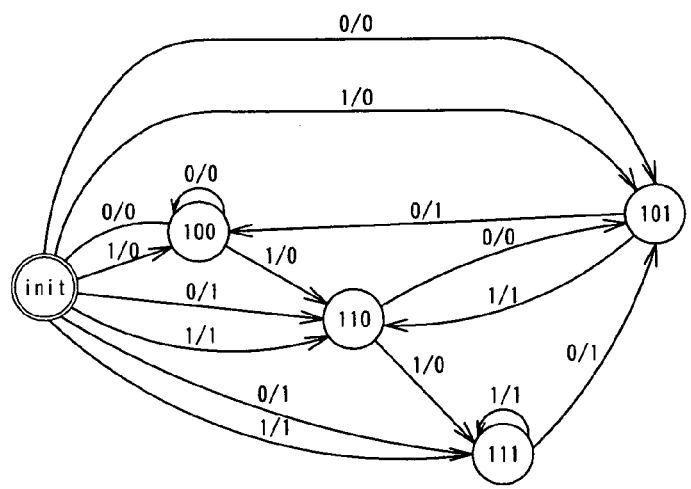
F I G. 28
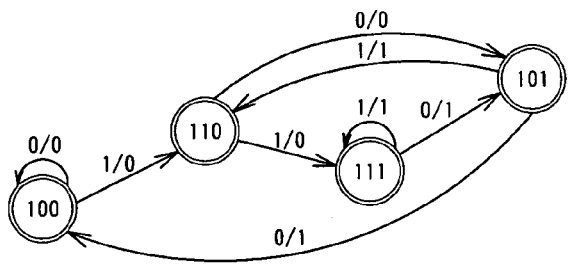
F I G. 29

| INPUT AND OUTPUT | | CURRENT STATE | | | NEXT STATE | | |
|---|---|---|---|---|---|---|---|
| u | y | tg | tx0 | tx1 | tg' | tx0' | tx1' |
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 1 | 0 |
| 1 | 0 | 0 | 0 | 0 | 0 | 1 | 0 |
| 1 | 0 | 0 | 0 | 0 | 1 | 0 | 0 |
| 0 | 0 | 0 | 0 | 0 | 1 | 1 | 0 |
| 0 | 1 | 0 | 0 | 1 | 0 | 0 | 0 |
| 1 | 1 | 0 | 0 | 1 | 0 | 0 | 0 |
| 0 | 1 | 0 | 0 | 1 | 0 | 1 | 0 |
| 1 | 1 | 0 | 0 | 1 | 0 | 1 | 0 |
| 1 | 1 | 0 | 0 | 1 | 1 | 0 | 0 |
| 0 | 1 | 0 | 0 | 1 | 1 | 1 | 0 |
| 0 | 0 | 0 | 1 | 0 | 0 | 0 | 1 |
| 1 | 0 | 0 | 1 | 0 | 0 | 0 | 1 |
| 0 | 0 | 0 | 1 | 0 | 0 | 1 | 1 |
| 1 | 0 | 0 | 1 | 0 | 0 | 1 | 1 |
| 1 | 0 | 0 | 1 | 0 | 1 | 0 | 1 |
| 0 | 0 | 0 | 1 | 0 | 1 | 1 | 1 |
| 0 | 1 | 0 | 1 | 1 | 0 | 0 | 1 |
| 1 | 1 | 0 | 1 | 1 | 0 | 0 | 1 |
| 0 | 1 | 0 | 1 | 1 | 0 | 1 | 1 |
| 1 | 1 | 0 | 1 | 1 | 0 | 1 | 1 |
| 1 | 1 | 0 | 1 | 1 | 1 | 0 | 1 |
| 0 | 1 | 0 | 1 | 1 | 1 | 1 | 1 |
| 0 | 0 | 1 | 0 | 0 | 1 | 0 | 0 |
| 1 | 0 | 1 | 0 | 0 | 1 | 1 | 0 |
| 0 | 1 | 1 | 0 | 1 | 1 | 0 | 0 |
| 1 | 1 | 1 | 0 | 1 | 1 | 1 | 0 |
| 0 | 0 | 1 | 1 | 0 | 1 | 0 | 1 |
| 1 | 0 | 1 | 1 | 0 | 1 | 1 | 1 |
| 0 | 1 | 1 | 1 | 1 | 1 | 0 | 1 |
| 1 | 1 | 1 | 1 | 1 | 1 | 1 | 1 |

FIG. 30

| tg | tx0 | tx1 |
|---|---|---|
| 1 | - | - |

NOTE: "-" INDICATES THAT EITHER "0" OR "1" IS AVAILABLE

FIG. 31

TRANSITION RELATION

| INPUT AND OUTPUT | | | CURRENT STATE | | | | NEXT STATE | | | |
|---|---|---|---|---|---|---|---|---|---|---|
| v | u | y | s | tg | tx0 | tx1 | s' | tg' | tx0' | tx1' |
| − | 0 | 0 | 0 | 0 | 0 | 0 | 0 | 0 | − | 0 |
| − | 0 | 0 | 0 | 0 | 1 | 0 | 0 | 0 | − | 1 |
| − | 0 | 1 | 1 | 0 | 0 | 1 | 1 | 0 | − | 0 |
| − | 0 | 1 | 1 | 0 | 1 | 1 | 1 | 0 | − | 1 |
| − | 1 | 0 | 1 | 0 | 0 | 0 | 0 | 0 | − | 0 |
| − | 1 | 0 | 1 | 0 | 1 | 0 | 0 | 0 | − | 1 |
| − | 1 | 1 | 0 | 0 | 0 | 1 | 1 | 0 | − | 0 |
| − | 1 | 1 | 0 | 0 | 1 | 1 | 1 | 0 | − | 1 |
| 0 | 0 | 0 | 0 | 0 | 0 | 0 | 0 | 1 | 1 | 0 |
| 0 | 0 | 0 | 0 | 0 | 1 | 0 | 0 | 1 | 1 | 1 |
| 0 | 0 | 0 | 0 | 1 | 0 | 0 | 0 | 1 | 0 | 0 |
| 0 | 0 | 0 | 0 | 1 | 1 | 0 | 0 | 1 | 0 | 1 |
| 0 | 0 | 1 | 1 | 0 | 0 | 1 | 1 | 1 | 1 | 0 |
| 0 | 0 | 1 | 1 | 0 | 1 | 1 | 1 | 1 | 1 | 1 |
| 0 | 0 | 1 | 1 | 1 | 0 | 1 | 1 | 1 | 0 | 0 |
| 0 | 0 | 1 | 1 | 1 | 1 | 1 | 1 | 1 | 0 | 1 |
| 0 | 1 | 0 | 1 | 0 | 0 | 0 | 0 | 1 | 1 | 0 |
| 0 | 1 | 0 | 1 | 0 | 1 | 0 | 0 | 1 | 1 | 1 |
| 0 | 1 | 0 | 1 | 1 | 0 | 0 | 0 | 1 | 0 | 0 |
| 0 | 1 | 0 | 1 | 1 | 1 | 0 | 0 | 1 | 0 | 1 |
| 0 | 1 | 1 | 0 | 0 | 0 | 1 | 1 | 1 | 1 | 0 |
| 0 | 1 | 1 | 0 | 0 | 1 | 1 | 1 | 1 | 1 | 1 |
| 0 | 1 | 1 | 0 | 1 | 0 | 1 | 1 | 1 | 0 | 0 |
| 0 | 1 | 1 | 0 | 1 | 1 | 1 | 1 | 1 | 0 | 1 |
| 1 | 0 | 0 | 0 | 0 | 0 | 0 | 0 | 1 | 0 | 0 |
| 1 | 0 | 0 | 0 | 0 | 1 | 0 | 0 | 1 | 0 | 1 |
| 1 | 0 | 0 | 0 | 1 | 0 | 0 | 0 | 1 | 1 | 0 |
| 1 | 0 | 0 | 0 | 1 | 1 | 0 | 0 | 1 | 1 | 1 |
| 1 | 0 | 1 | 1 | 0 | 0 | 1 | 1 | 1 | 0 | 0 |
| 1 | 0 | 1 | 1 | 0 | 1 | 1 | 1 | 1 | 0 | 1 |
| 1 | 0 | 1 | 1 | 1 | 0 | 1 | 1 | 1 | 1 | 0 |
| 1 | 0 | 1 | 1 | 1 | 1 | 1 | 1 | 1 | 1 | 1 |
| 1 | 1 | 0 | 1 | 0 | 0 | 0 | 0 | 1 | 0 | 0 |
| 1 | 1 | 0 | 1 | 0 | 1 | 0 | 0 | 1 | 0 | 1 |
| 1 | 1 | 0 | 1 | 1 | 0 | 0 | 0 | 1 | 1 | 0 |
| 1 | 1 | 0 | 1 | 1 | 1 | 0 | 0 | 1 | 1 | 1 |
| 1 | 1 | 1 | 0 | 0 | 0 | 1 | 1 | 1 | 0 | 0 |
| 1 | 1 | 1 | 0 | 0 | 1 | 1 | 1 | 1 | 0 | 1 |
| 1 | 1 | 1 | 0 | 1 | 0 | 1 | 1 | 1 | 1 | 0 |
| 1 | 1 | 1 | 0 | 1 | 1 | 1 | 1 | 1 | 1 | 1 |

FIG. 36

| s | tg | tx0 | tx1 |
|---|----|-----|-----|
| 0 | 1  | –   | –   |

FIG. 37

CONTROLLABLE SIMULATION RELATION

| s | tg | tx0 | tx1 |
|---|----|-----|-----|
| 0 | 0  | 0   | 0   |
| 0 | 0  | 1   | 0   |
| 0 | 1  | 0   | 0   |
| 0 | 1  | 1   | 0   |
| 1 | 0  | 0   | 1   |
| 1 | 0  | 1   | 1   |
| 1 | 1  | 0   | 1   |
| 1 | 1  | 1   | 1   |

FIG. 38

PERMISSIBLE OPERATION MODEL (TRANSITION RELATION)

| INPUT AND OUTPUT | | | CURRENT STATE | | | | NEXT STATE | | | |
|---|---|---|---|---|---|---|---|---|---|---|
| v | u | y | s | tg | tx0 | tx1 | s' | tg' | tx0' | tx1' |
| – | 0 | 0 | 0 | 0 | 0 | 0 | 0 | 0 | – | 0 |
| – | 0 | 1 | 1 | 0 | 1 | 1 | 1 | 0 | – | 1 |
| – | 1 | 0 | 1 | 0 | 1 | 0 | 0 | 0 | – | 1 |
| – | 1 | 1 | 0 | 0 | 0 | 1 | 1 | 0 | – | 0 |
| 0 | 0 | 0 | 0 | 0 | 0 | 0 | 0 | 1 | 1 | 0 |
| 0 | 0 | 0 | 0 | 1 | 0 | 0 | 0 | 1 | 0 | 0 |
| 0 | 0 | 1 | 1 | 0 | 1 | 1 | 1 | 1 | 1 | 1 |
| 0 | 0 | 1 | 1 | 1 | 1 | 1 | 1 | 1 | 0 | 1 |
| 0 | 1 | 0 | 1 | 0 | 1 | 0 | 0 | 1 | 1 | 1 |
| 0 | 1 | 0 | 1 | 1 | 1 | 0 | 0 | 1 | 0 | 1 |
| 0 | 1 | 1 | 0 | 0 | 0 | 1 | 1 | 1 | 1 | 0 |
| 0 | 1 | 1 | 0 | 1 | 0 | 1 | 1 | 1 | 0 | 0 |
| 1 | 0 | 0 | 0 | 0 | 0 | 0 | 0 | 1 | 0 | 0 |
| 1 | 0 | 0 | 0 | 1 | 0 | 0 | 0 | 1 | 1 | 0 |
| 1 | 0 | 1 | 1 | 0 | 1 | 1 | 1 | 1 | 0 | 1 |
| 1 | 0 | 1 | 1 | 1 | 1 | 1 | 1 | 1 | 1 | 1 |
| 1 | 1 | 0 | 1 | 0 | 1 | 0 | 0 | 1 | 0 | 1 |
| 1 | 1 | 0 | 1 | 1 | 1 | 0 | 0 | 1 | 1 | 1 |
| 1 | 1 | 1 | 0 | 0 | 0 | 1 | 1 | 1 | 0 | 0 |
| 1 | 1 | 1 | 0 | 1 | 0 | 1 | 1 | 1 | 1 | 0 |

FIG. 39

PERMISSIBLE OPERATION MODEL
(SET OF INITIAL STATES)

| s | tg | tx0 | tx1 |
|---|----|-----|-----|
| 0 | 1  | –   | –   |

FIG. 40

CONTROL RULE

| u | v | s | tg | tx0 | tx1 |
|---|---|---|----|-----|-----|
| 0 | 0 | 0 | 0  | 0   | 0   |
| 0 | 0 | 0 | 1  | 0   | 0   |
| 0 | 0 | 1 | 0  | 1   | 1   |
| 0 | 0 | 1 | 1  | 1   | 1   |
| 0 | 1 | 0 | 0  | 0   | 0   |
| 0 | 1 | 0 | 1  | 0   | 0   |
| 0 | 1 | 1 | 0  | 1   | 1   |
| 0 | 1 | 1 | 1  | 1   | 1   |
| 1 | 0 | 0 | 0  | 1   | 0   |
| 1 | 0 | 0 | 1  | 1   | 0   |
| 1 | 0 | 1 | 0  | 0   | 1   |
| 1 | 0 | 1 | 1  | 0   | 1   |
| 1 | 1 | 0 | 0  | 1   | 0   |
| 1 | 1 | 0 | 1  | 1   | 0   |
| 1 | 1 | 1 | 0  | 0   | 1   |
| 1 | 1 | 1 | 1  | 0   | 1   |

FIG. 41

AUTOMATIC DESIGN APPARATUS, AUTOMATIC DESIGN METHOD, AND AUTOMATIC DESIGN PROGRAM OF DIGITAL CIRCUIT

CROSS REFERENCE TO RELATED APPLICATION

This application is based upon and claims the benefit of priority of the prior Japanese Patent Application No. 2006-23212, filed Jan. 31, 2006, the entire contents of which are incorporated herein by reference.

BACKGROUND OF THE INVENTION

1. Field of the Invention

The present invention relates to an automatic design apparatus, an automatic design method, and an automatic design program of a digital circuit that automatically design a control apparatus to meet a predetermined control specification.

2. Description of the Related Art

As the density of an integrated circuit increases, design data of integrated circuits is increasingly reused when designing an integrated circuit. In an integrated circuit design field, the design property that can be reused is referred to as intellectual property (IP).

In a system level design of an integrated circuit that has been recently used, a method is proposed in which a design of an arithmetic function is separated from, for example, a design of a communication interface in order to increase the reusability of IP and decrease the burden on verification.

The design of an interface circuit is a work that easily causes a designer to make an error. This design requires an accurate description of operation timings with consideration of various inputs from other modules operating in parallel. Even when the design is sufficiently carefully created, an erroneous operation under a specific condition cannot be completely avoided.

For this reason, in general, the design result is verified meticulously. Examples of the verification include simulation-based verification and formal verification.

The simulation-based verification requires an input for the examination (i.e., test vector). To create the test vector requires another effort in addition to the design work. Additionally, the simulation-based verification requires significant effort to check the result of simulation. Furthermore, to exhaustively verify even a rare situation, an enormous amount of time is required.

Property checking is one type of the formal verification. The property checking is a method in which, by defining a specification (property) that describes the desired circuit operations, it is automatically examined whether the design result satisfies the property. The property checking eliminates the need for test vectors. In addition, the property checking can exhaustively verify even a rare situation. Thus, in recent years, the property checking has drawn attention.

In general, the property is written in a language based on a temporal logic (a logical system that handles logical statements of Boolean algebra enhanced with temporal operators). Examples of such a language include the PSL and the SystemVerilog Assertion.

In verification of an interface circuit, defects that exceptionally cause an incorrect operation are found, and therefore, the property checking is suitable. Additionally, since, in many cases, an interface circuit employs the bus standard and the frequently used interface format, a predefined property can be applied. As a result, the number of required steps for the verification can be reduced.

However, the simulation-based verification and the property checking provide only a method for verifying the design result. If a design error is found, the design is corrected and the verification is carried out again. This procedure requires a large amount of manpower. Accordingly, there is need for a method that automatically acquires a model of a control apparatus (interface circuit), like a design method of a control system described below.

In particular, in many cases of designing an interface circuit, the control specification (property) can be prepared in advance. Accordingly, an automatic design of a control system can significantly facilitate the verification.

In general, a digital apparatus can be modeled as a discrete event system. Among discrete event systems, the simplest and widely used system is a finite state machine (FSM). Many types of FSMs are available. For example, an automaton, a sequential machine, and a Kripke structure belong to an FSM.

The automaton is used as a language model in a language theory. The Kripke structure is used as a temporal logic model in a logical theory. The sequential machine is used as a digital circuit model.

One of the basic technologies for generating a model of a control apparatus is described by Sunil P. Khatri, Amit Narayan, Sriram C. Krishnan, Kenneth L. McMillan, Robert. K. Brayton, and A. Sangiovanni-Vincentelli, "Engineering Change in a Non-Deterministic FSM Setting", Proceedings of the 33rd annual conference on Design automation, pp. 451-456, ISBN: 0-89791-779-0, 1996 (hereinafter referred to as "Non-patent Document 1"). Non-patent Document 1 discusses two elements: a control apparatus and a control target. In a control system including the two elements having a predetermined relationship therebetween, a control apparatus model M2 is generated from a model M of the specification of the control system (control specification) and a control target model M1. In Non-patent Document 1, these models are regarded as models of sequential machines.

In addition, in the fields of the above-described property checking, the properties (control specification) tend to be expressed as temporal logic expressions. The principal of the property checking is model checking. In model checking, a model of an object to be verified (tested) is expressed as the Kripke structure, and it is determined whether this Kripke structure model is a formula of a temporal logic, that is, it is determined whether this Kripke structure satisfies the temporal logic expressions.

Many documents have described model checking. For example, Japanese Patent No. 3600420 describes technology that efficiently performs model checking.

Additionally, it is common that a sequential machine is employed in a sequential circuit design. When the sequential machine is applied to model checking, a relationship between the sequential machine and a Kripke structure should be clearly defined. This relationship between the sequential machine and a Kripke structure is described by Hiromi HIRAISHI and Kiyoharu HAMAGUCHI, "Formal Verification Methods Based on Logic Function Manipulation" Journal of Information Processing Society of Japan, vol. 35 No. 8, August, 1994 (hereinafter referred to as "Non-patent Document 2").

Also, E. M. Clarke, Orna Grumberg, and Doron Peled, "Model Checking", MIT Press, ISBN: 0-262-03270-8, 2000 (hereinafter referred to as "Non-patent Document 3") describes a method for creating a tableau from a temporal logic called linear temporal logic (LTL) or from a temporal logic called ACTL. In the ACTL, a temporal logic called computer tree logic (CTL) is restricted not to use an operator of E (possible), but to use only an operator of A (necessary).

As described above, the technology described in Non-patent Document 1 describes the creation of a control apparatus model M2 from a model M of the specification of the control system (control specification) and a control target model M1. This technology suggests that automatic design of the control apparatus model M2 is possible.

However, Non-patent Document 1 describes neither the detailed procedure of the automatic design of the control apparatus model M2 nor the detailed functional structure of an apparatus for providing the automatic design.

Furthermore, in Non-patent Document 1, the control specification model M is regarded as a sequential machine model. However, in general, as described in the model checking, a model M of the specification of a control system (control specification) defined as a temporal logic model is more accurate and simpler than that defined as a sequential machine model.

SUMMARY OF THE INVENTION

Accordingly, it is an object of the present invention to provide an automatic design apparatus, an automatic design method, and an automatic design program for a digital control system including a control apparatus connected to a control target that can automatically design the control apparatus to meet a predetermined control specification when a specification of the control target and a control specification of the control system are given. It is another object of the present invention to provide an automatic design apparatus, an automatic design method, and an automatic design program that can automatically design the control apparatus even when a control specification represented by a temporal logic is given.

According to an aspect of the present invention, an automatic design apparatus for a digital control system circuit including a control target circuit and a control apparatus circuit automatically designs a model of the control apparatus circuit in the case where a model of the control target circuit and a specification model of the digital control system circuit are given. The apparatus includes control target input unit configured to receive a first control target model that is the model of the control target circuit and that is written in a predetermined design description language, control target model generating unit configured to generate a second control target model represented by a finite state machine model from the first control target model, control target model storage unit configured to store the generated second control target model, control specification input unit configured to receive at least a first control specification model that is the specification model of the control system circuit and that is written in a predetermined design description language, control specification model generating unit configured to generate a second control specification model represented by a finite state machine model from at least the first control specification model, control specification model storage unit configured to store the second control specification model, model composing unit configured to generate a control apparatus synthesis model that is a synthesis model of the control apparatus circuit by computing a logical AND of the second control target model stored in the control target model storage unit and the second control specification model stored in the control specification model storage unit, controllable simulation relation computing unit configured to compute controllable simulation relation representing a constraint condition imposed on the control apparatus synthesis model from the second control target model and the second control specification model, controllable simulation relation storage unit configured to store the computed controllable simulation relation, controllability determining unit configured to determine whether the control apparatus synthesis model is a model capable of providing control for satisfying the specification of the control system circuit on the basis of the controllable simulation relation, permissible operation model generating unit configured to generate, from the control apparatus synthesis model and the controllable simulation relation, a permissible operation model that is a model obtained by reducing the scale of the control apparatus synthesis model, permissible operation model storage unit configured to store the generated permissible operation model, control rule determining unit configured to determine a control rule capable of further reducing the scale of the permissible operation model, and control apparatus model generating unit configured to generate a control apparatus model represented by a finite state machine model by computing a logical AND of the permissible operation model and the control rule.

According to another aspect of the present invention, an automatic design method for a digital control system circuit including a control target circuit and a control apparatus circuit automatically designs a model of the control apparatus circuit in the case where a model of the control target circuit and a specification model of the digital control system circuit are given. The method includes the steps of receiving a first control target model that is the model of the control target circuit and that is written in a predetermined design description language, generating a second control target model represented by a finite state machine model from the first control target model, receiving at least a first control specification model that is the specification model of the control system circuit and that is written in a predetermined design description language, generating a second control specification model represented by a finite state machine model from at least the first control specification model, generating a control apparatus synthesis model that is a synthesis model of the control apparatus circuit by computing a logical AND of the second control target model and the second control specification model, computing controllable simulation relation representing a constraint condition imposed on the control apparatus synthesis model from the second control target model and the second control specification model, determining whether the control apparatus synthesis model is a model capable of providing control for satisfying the specification of the control system circuit on the basis of the controllable simulation relation, generating, from the control apparatus synthesis model and the controllable simulation relation, a permissible operation model that is a model obtained by reducing the scale of the control apparatus synthesis model, determining a control rule capable of further reducing the scale of the permissible operation model, and generating a control apparatus model represented by a finite state machine model by computing a logical AND of the permissible operation model and the control rule.

According to still another aspect of the present invention, an automatic design program for a digital control system circuit including a control target circuit and a control apparatus circuit automatically designs a model of the control apparatus circuit in the case where a model of the control target circuit and a specification model of the digital control system circuit are given. The program includes instructions for causing a computer to execute the steps of receiving a first control target model that is the model of the control target circuit and that is written in a predetermined design description language, generating a second control target model represented by a finite state machine model from the first control target model, receiving at least a first control specification model that is the specification model of the control system circuit and that is written in a predetermined design description language, generating a second control specification model represented by a finite state machine model from at least the first control specification model, generating a control apparatus synthesis model that is a synthesis model of the control apparatus circuit by computing a logical AND of the second control target model and the second control specification model, computing controllable simulation relation representing a constraint condition imposed on the control apparatus synthesis model from the second control target model and the second control specification model, determining whether the control apparatus synthesis model is a model capable of providing control for satisfying the specification of the control system circuit on the basis of the controllable simulation relation, generating, from the control apparatus synthesis model and the controllable simulation relation, a permissible operation model that is a model obtained by reducing the scale of the control apparatus synthesis model, determining a control rule capable of further reducing the scale of the permissible operation model, and generating a control apparatus model represented by a finite state machine model by computing a logical AND of the permissible operation model and the control rule.

According to the present invention, an automatic design apparatus, an automatic design method, and an automatic design program for a digital control system including a control apparatus connected to a control target automatically design the control apparatus to meet a predetermined control specification when a specification of the control target and a control specification of the control system are given. Additionally, even when a control specification represented by a temporal logic is given, the control apparatus can be automatically designed.

BRIEF DESCRIPTION OF THE DRAWINGS

FIGS. 6A and 6B illustrate the control specification model of a control system of the example represented by a sequential machine model (transition relation and initial state);

FIG. 7 illustrates the control specification model of a control system of the example represented by a state transition diagram;

FIG. 8 illustrates a timing diagram of the operation of the control specification model of a control system of the example obtained by simulation;

FIGS. 9A and 9B illustrate a control target model of the example written in the Verilog language;

FIGS. 10A and 10B illustrate the control target model of the example in the form of transition relation and an initial state;

FIG. 11 illustrates a state transition diagram of the control target model of the example;

FIGS. 12A and 12B are diagrams illustrating a control system model and a control specification model quoted from Non-Patent Document 1;

FIG. 13 is a diagram illustrating a controllable simulation relation of the example;

FIGS. 14A and 14B are diagrams illustrating a permissible operation model of the example;

FIG. 15 is a diagram illustrating a control rule of a control apparatus of the example;

FIGS. 16A and 16B are diagrams illustrating a control apparatus model of the example represented by a transition relation and an initial state;

FIG. 17 is a first diagram illustrating a control apparatus model of the example written in the Verilog language;

FIG. 21 illustrates a control specification model written in a temporal logic-based language according to the second embodiment;

FIG. 22 illustrates an assignment of elementary subformulas expanded according to a tableau rule and state variables;

FIG. 23 illustrates a specific example of a control specification model in the form of transition relation according to the second embodiment;

FIG. 24 illustrates the initial state of a specific example of the control specification model according to the second embodiment;

FIG. 27 is a first diagram illustrating the specific example of the control specification model in the form of a destination-node selective tableau according to the second embodiment;

FIG. 28 is a second diagram illustrating the specific example of the control specification model in the form of a destination-node selective tableau according to the second embodiment;

FIG. 29 is a third diagram illustrating the specific example of the control specification model in the form of a destination-node selective tableau according to the second embodiment;

FIG. 30 is a truth table representing a transition relation shown in FIG. 29;

FIG. 31 is a table representing the initial states of the transition relation shown in FIG. 29;

FIG. 36 illustrates a transition relation of a control apparatus synthesis model obtained by composing a control specification model and a control target model;

FIG. 37 illustrates initial states of the control apparatus synthesis model obtained by composing a control specification model and a control target model;

FIG. 38 illustrates a controllable simulation relation of a specific example according to the second embodiment;

FIG. 39 illustrates a transition relation of a specific example of a permissible operation model according to the second embodiment;

FIG. 40 illustrates initial states of the specific example of a permissible operation model according to the second embodiment; and FIG. 41 illustrates a control rule of the specific example according to the second embodiment.

DESCRIPTION OF THE PREFERRED EMBODIMENTS

An automatic design apparatus, an automatic design method, and an automatic design program of a digital circuit according to exemplary embodiments of the present invention are now herein described with reference to the accompanying drawings.

1. First Exemplary Embodiment

Figure 1:
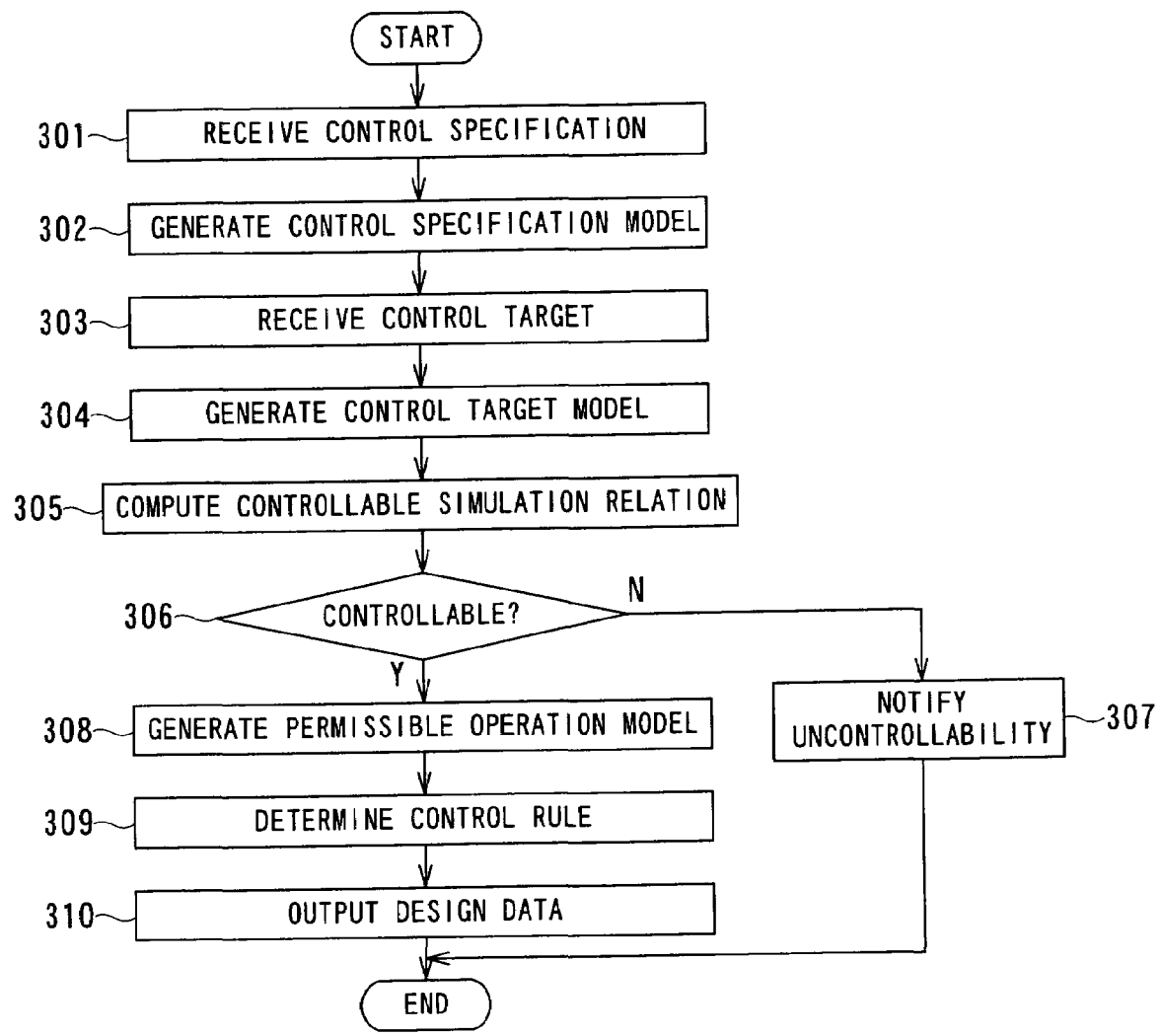
FIG. 1 is a flow chart illustrating an automatic design method and an automatic design program of a digital circuit according to an exemplary embodiment of the present invention.

FIG. 1 is a flow chart illustrating an automatic design method of a digital circuit according to a first exemplary embodiment of the present invention. Steps shown in FIG. 1 are described briefly. Thereafter, the detailed descriptions are provided with reference to an example.

At control specification input step 301, data about the control specification (first control specification model) is input. For example, this data is written in a design description language (e.g., Verilog, VHDL, SystemC, or SpecC) or a programming language (e.g., C). As used herein, the specification written in one of these languages is also referred to as an executable specification. The language for writing the executable specification is also referred to as an executable specification language.

The executable specification can be executed in the form of a computer program. The executable specification may be used for simulation or may be used for a program of a processor incorporated in a control system of an implemented apparatus.

Additionally, the executable specification may be data written in a language, such as PSL or SystemVerilog Assertion, to represent properties based on a temporal logic or another logical expression.

At control specification model generating step 302, the input data about the control specification is converted to data expressed by a finite state machine (FSM) model (i.e., control specification model M: second control specification model).

At control target input step 303, data representing a control target model (first control target model) is input. That is, this data represents the details of a circuit to be controlled. This data is written in a design description language (e.g., Verilog, VHDL, SystemC, or SpecC). At control target model generating step 304, this data is converted to data expressed by a finite state machine (FSM) model (i.e., control target model M1: second control target model).

Subsequently, at controllable simulation relation computing step 305, the controllable simulation relation is computed. The controllable simulation relation is computed from the control target model M1 and the control specification model M expressed as an FSM. Basically, the controllable simulation relation is computed on the basis of the equation described in Non-patent document 1.

At controllability determining step 306, it is determined whether control that meets the control specification is available on the basis of the computation result. If the control is not available, that information is notified to a designer and the process is completed at uncontrollability notifying step 307.

In contrast, if the control is available, data about a permissible operation model is generated at permissible operation model generating step 308. The permissible operation model is generated by imposing the constraint conditions derived from the controllable simulation relation on a control apparatus synthesis model, which is generated by simply composing the control target model M1 and the control specification model M.

Subsequently, at control rule determining step 309, a control rule is determined from the permissible operation model. On the basis of the control rule, a control apparatus model is generated. At design data output step 310, the generated control apparatus model is output.

Figure 2:
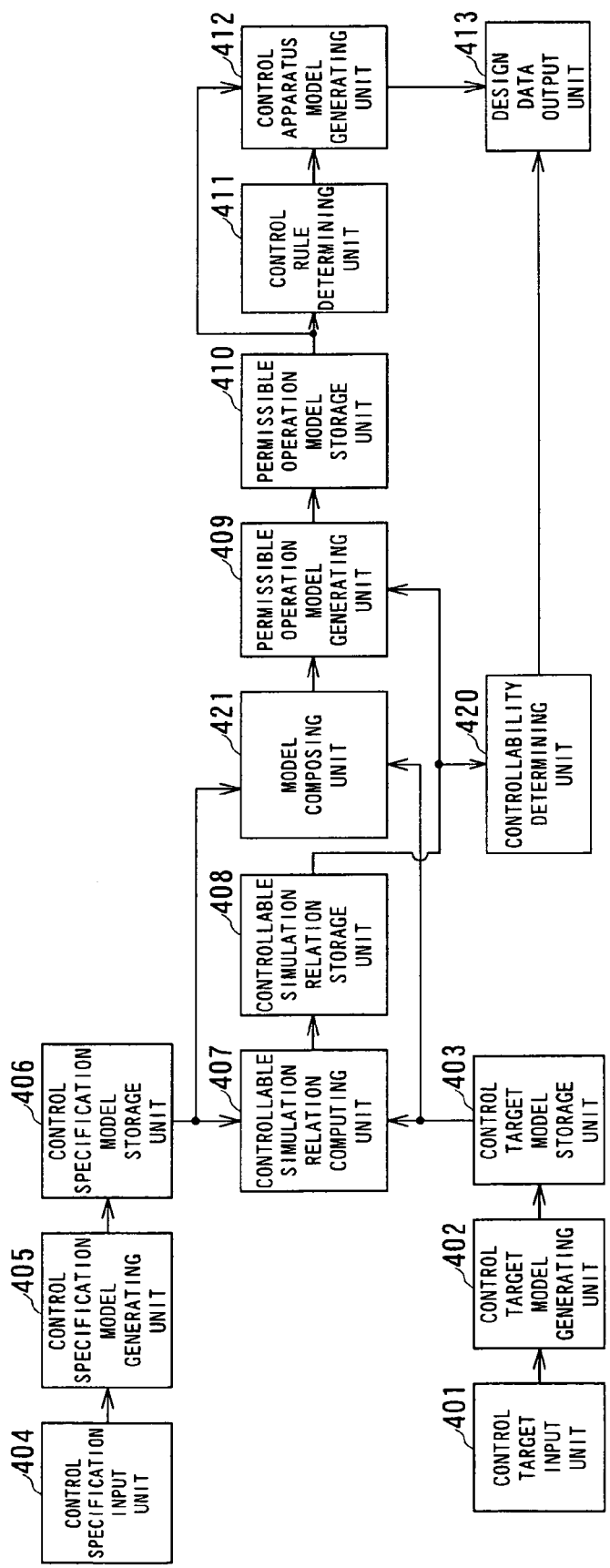
FIG. 2 illustrates an exemplary configuration of the automatic design apparatus of a digital circuit according to a first embodiment of the present invention.

FIG. 2 illustrates an exemplary configuration of the automatic design apparatus of a digital circuit according to this embodiment. The configuration primarily includes units for realizing the processes of the steps shown in FIG. 1.

Control specification input unit 404 realizes the operation at control specification input step 301. The control specification input unit 404 receives data about a control specification model. This data is input from, for example, a file stored in a storage unit of a computer, a communication network, or an input unit of a computer by a designer.

Control specification model generating unit 405 realizes the operation at control specification model generating step 302. The control specification model generating unit 405 converts the input data about the control specification to data representing an FSM and stores the data in control specification model storage unit 406.

Control target input unit 401 realizes the operation at control target input step 303. The control target input unit 401 receives data representing a control target model written in a design description language, such as Verilog. This data is input from, for example, a file stored in a storage unit of a computer, a communication network, or an input unit of a computer by a designer.

Control target model generating unit 402 realizes the operation at control target model generating step 304. The control target model generating unit 402 converts an input control target model to an FSM and stores the FSM in control target model storage unit 403.

Controllable simulation relation computing unit 407 realizes the operation at controllable simulation relation computing step 305. The controllable simulation relation computing unit 407 computes the controllable simulation relation using the control target model stored in the control target model storage unit 403 and the control specification model stored in the control specification model storage unit 406. The controllable simulation relation computing unit 407 then stores the resultant controllable simulation relation in controllable simulation relation storage unit 408.

The determination at controllability determining step 306 is made by controllability determining unit 420. If the control is not possible, the controllability determining unit 420 output that information to design data output unit 413 and the process is completed.

Model composing means simply composes the control specification model M stored in the control specification model storage unit 406 and the control target model M1 stored in the control target model storage unit 403 so as to generate a control apparatus synthesis model.

Permissible operation model generating unit 409 realizes the operation at permissible operation model generating step 308. The permissible operation model generating unit 409 imposes the constraint conditions derived from the controllable simulation relation on a control apparatus synthesis model so as to generate a permissible operation model. The permissible operation model generating unit 409 then stores the generated permissible operation model in permissible operation model storage unit 410.

Control rule determining unit 411 realizes the operation at control rule determining step 309. The control rule determining unit 411 determines a control rule from the permissible operation model and outputs the determined rule to control apparatus model generating unit 412.

By applying the control rule to the permissible operation model, the control apparatus model generating unit 412 generates a control apparatus model expressed in the form of an FSM. Subsequently, the control apparatus model generating unit 412 converts the control apparatus model to a control apparatus model written in a predetermined design description language, such as Verilog.

The design data output unit 413 realizes the operation at design data output step 310. That is, the design data output unit 413 outputs the control apparatus model generated and converted by the control apparatus model generating unit 412. This output is stored in a storage unit of a computer as a file, is delivered into a communication network, or is directly delivered to a designer via an output unit of a computer so that the control apparatus model can be implemented as a digital apparatus.

For example, the model can be implemented into a digital circuit by a logic synthesis tool. Alternatively, by providing a program to a computer, a desired operation can be obtained from the computer.

2. Illustrative example

Figures 3A, 3B, 4:
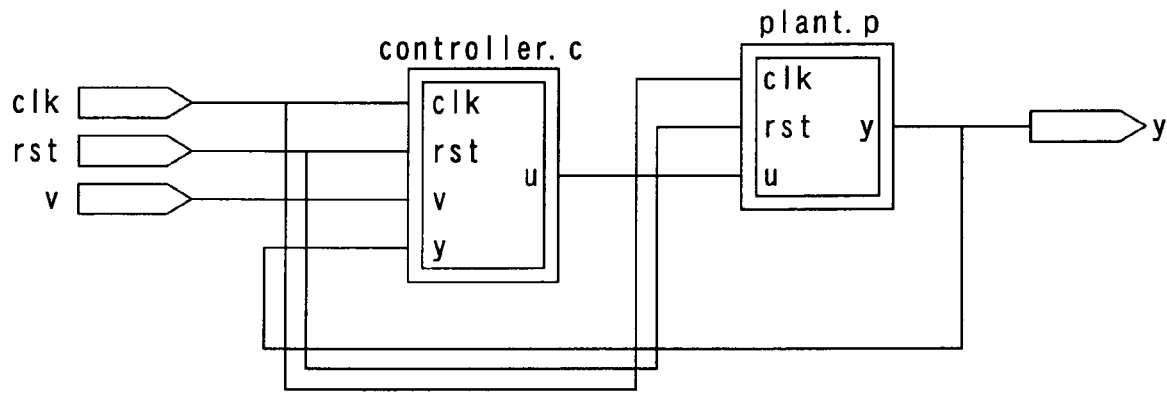
FIGS. 3A and 3B illustrate the entire configuration of an example of a control system used for illustrating an automatic design method, an automatic design program, and an automatic design apparatus of a digital circuit according to the present invention.
FIG. 4 illustrates only definitions of signal names of the example written in the Verilog language.

The automatic design method of a digital circuit described above is now herein described in detail by way of illustrative example. FIGS. 3A and 3B illustrate the entire configuration of a control system of this example.

FIG. 3A illustrates the entire configuration of a control system of this example written in the Verilog language, and FIG. 3B illustrates the diagram of interconnections of the control system.

In FIG. 3A, "control_system" written in line 1 indicates a module representing the entire control system. A module labeled "plant" written inside "control_system" is a control target. A module labeled "controller" is a control apparatus.

A clock signal clk, a reset signal rst, and an extraneous signal v are externally input to the control system. Interconnections of the signals are connected to the control target and the control apparatus, as shown in FIG. 3B. A name "p" is defined as an instance of the module "plant" and a name "c" is defined as an instance of the module "controller" (see lines 7 and 8 in FIG. 3A). As used herein, "p" and "c" are referred to as a "control target" and a "control apparatus", respectively.

As can be seen from the above-described configuration, the clock signal clk, the reset signal rst, the extraneous signal v, a control output signal y, and a control input signal u are connected to the control apparatus. FIG. 4 illustrates these connections written in the Verilog language. Here, this representation is a module that defines only the names of signals connected to the control apparatus, but not a description about a flip-flop to be present inside the control apparatus and description about the operation of the flip-flop. In FIG. 4, line 7 includes the statement "/* not implemented */". By replacing this line with required descriptions, the control apparatus model is achieved. That is, the object of this embodiment is replacing this line with detailed description about a flip-flop and description about the operation of the flip-flop.

First, the control specification of the control system is input (step 301 shown in FIG. 1).

Figures 5A, 5B:
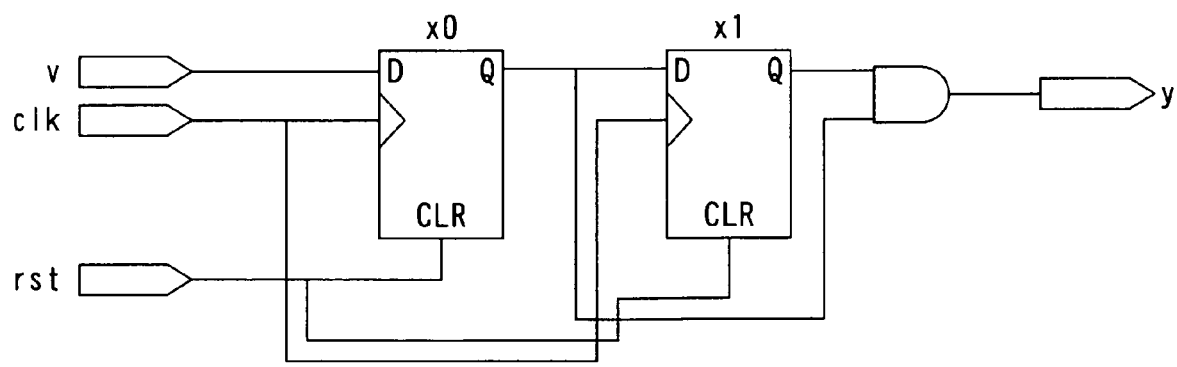
FIGS. 5A and 5B illustrate a control specification model of a control system of the example written in the Verilog language.

FIG. 5A illustrates the control specification of the control system according to this illustrative example. In this embodiment, a circuit module, which is a control target, is written in the Verilog language.

Nowadays, many designers represent detailed design using a design language (e.g., Verilog or VHDL). In general, the abstract level of the description is the register transfer level (RTL). To design a circuit using a RTL description, a logic synthesis tool is employed. The logic synthesis tool receives design data written in a RTL description and converts the design data to a more detailed circuit model.

The RTL description is modeled as a sequential machine. The value of a flip-flop corresponds to a state of the sequential machine. The change in the value corresponds to a state transition. In synchronous sequential circuits, a state transition occurs in synchronization with a clock. Even when a design at an abstract level higher than the RTL is created using SystemC or SpecC, an FSM model can be obtained during a CAD process.

In FIG. 5A, the statements inside a closing line are written in the Verilog language. The numbers at the left are line numbers for illustrative purpose. This module has a clock input clk, an asynchronous reset input rst, and an extraneous signal input v, and an output y (see lines 1 to 4). These inputs and output are 1-bit signal lines.

Additionally, the module includes two flip-flops x0 and x1 (see line 6). The values of these flip-flops become zero at reset time (see lines 10 and 16 and their neighbors). The flip-flop x0 receives the value of the signal v at the rising edge of the clock, keeps the value, and outputs the value (see line 12 and its neighbors). Similarly, the flip-flop x1 receives the output value from the flip-flop x0 at the rising edge of the clock, keeps the value, and outputs the value (see line 18 and its neighbors). The output y outputs a logical AND of the output of the flip-flop x0 and the output of the flip-flop x1 (see line 20).

From the description written in the Verilog language, an actual digital circuit can be generated using a logic synthesis tool or the like. FIG. 5B illustrates an example of the circuit output from a logic synthesis tool. The flip-flops x0 and x1 are generated as D flip-flops. The signal line clk of the clock input is connected to these D flip-flops. The D flip-flops are triggered by the positive edge of the clock input. The signal line rst of the reset input is connected to reset inputs CLR of the two D flip-flops. The outputs of these flip-flops are connected to a two-input AND gate. The output of this AND gate serves as the output signal y of the module.

Subsequently, the control specification model generating unit 405 generates data representing a sequential machine as shown in FIGS. 6A and 6B from the input data (i.e., data written in the Verilog language) (step 302 shown in FIG. 1). The control specification model generating unit 405 then stores the generated data in the control specification model storage unit 406. This operation is well known and is executed in widely used programs, such as a logic synthesis tool and a property checking tool. FIG. 6A illustrates data representing the relationship between the input and output and a state of the control target in the form of a transition table. FIG. 6B illustrates a set of initial states.

In FIG. 6A, in order to distinguish a state before transition (i.e., current state) from a state after the transition (i.e., next state), the variables representing the next states are identified by the same reference symbols followed by a prime symbol (') (for example, x0' and x1').

This table is now herein described. In the circuit shown in FIG. 5B, if, for example, the state of x0 (i.e., output of x0) is "1" and the state of x1 (i.e., output of x1) is "0" and if the input v is "1", then the output y is "0". Suppose that, in this state, state transition occurs due to the positive edge of the clock. Then, x0 is"1" and x1 is "1" after the transition. When the input and output signals, the current state, and the next state are lined up in the order of v, y, x1, x0, x1', and x0', the value 100111 is generated. This value corresponds to row 4 of the table shown in FIG. 6A. The number of all the combination of other values is 8. FIG. 6A illustrates the table containing these combinations. Thus, the transition relationship can be obtained.

FIG. 6B illustrates a table representing a state of this circuit immediately after reset (i.e., initial state). The two flip-flops become zero by the reset. Therefore, the initial state takes only one state in which x0 is "0" and x1 is "0". In general, the initial state of a sequential machine is not always one. Accordingly, the initial state is expressed as a set of initial states.

FIG. 7 illustrates a state transition diagram including the same information as in FIGS. 6A and 6B. When x1 and x0 are represented as two bits, four states "00", "01", "10", and "11" are available. These states are represented as nodes denoted as circles. Arrows between the states denote state transitions. The arrows are labeled with, for example, 1/0 or 0/0. In this label, an input value appears at the left of "/" and an output value appears at the right of "/". The node with a double circle denotes an initial state ("00" in this example).

As can be seen from the foregoing description, the same state is represented in the following different forms: the circuit representation written in a design description language shown in FIG. 5A, the circuit diagram shown in FIG. 5B, the representation of data indicating the set of the transition relationship and initial states of a sequential machine shown in FIGS. 6A and 6B, and the state transition diagram shown in FIG. 7. These forms are equivalent to represent the operation of a sequential circuit and can be changed to each other.

As a reference, FIG. 8 illustrates the result of simulating the circuit model shown in FIGS. 5A and 5B. "clk" represents a periodic clock input. Only one pulse is provided to "rst" in the initial stage of the simulation so that a flip-flop inside the circuit is reset and x0 and x1 have the value of zero. An input "v" is input in synchronization with the clock. The value of "v" changes well before the positive edge of the clock to ensure a setup time of the flip-flop. "x0" and "x1" are the outputs of the corresponding flip-flops. "y" is the output of a module. A waveform delayed from "v" by one clock cycle appears in x0, and a waveform delayed from x0 by one clock cycle appears in x1. Also, "y" becomes "1" only when both x0 and x1 are "1".

So far, the control specification of the control system written in the Verilog language (see FIG. 5A) has been converted to the control specification model represented as a model of a sequential machine (see FIGS. 6A and 6B) (steps 301 and 302 shown in FIG. 1).

Subsequently, a control target model is input at step 303 shown in FIG. 1.

FIG. 9A illustrates a control target model according to this embodiment. In this example, a circuit module, which is the control target, is also written in the Verilog language.

This circuit module has a clock input clk, a reset input rst, a control input u, and a control output y, each of which is a 1-bit signal line (see lines 1 to 4 in FIG. 9A). The circuit module contains one flip-flop (see line 5), which maintains the state of the circuit module. "s" represents the value of the state.

Input of the reset input rst changes the value s to "0" (see line 10 and its neighbors). Also, the positive edge of clk changes the state s (see line 8). At that time, the exclusive OR of the current state s and the control input u becomes the value of the next state s' (see line 12). It is noted that the operator "^" means the exclusive OR.

FIG. 9B is a circuit diagram of a circuit generated from the model shown in FIG. 9A and written in the Verilog language using a logic synthesis tool. Here, the circuit includes one D flip-flop having an enable input ENA. The control target input unit 401 receives, for example, data in a file stored in a storage unit of a computer (see FIG. 9A).

Thereafter, the control target model generating unit 402 generates data representing a sequential machine model shown in FIGS. 10A and 10B from the input data. The control target model generating unit 402 then stores the generated data in the control target model storage unit 403. This operation is well known and is executed in widely used programs, such as a logic synthesis tool and a property checking tool. FIG. 10A illustrates data representing the relationship between the input and output and a state of the control target in the form of a transition table. FIG. 10B illustrates a set of initial states.

To store a table including "0" s and "1" s as shown in FIGS. 10A and 10B, using a widely used technology known as a binary decision diagram (BDD) is desirable. In many cases, by using the BDD, the relationship using Boolean values of "0" and "1" can be stored with a small memory usage. Also, the BDD advantageously provides high-speed operations required for this embodiment. However, the BDD is not always necessary. Any means that can store a table including Boolean values can be used. For example, the relationship can be stored in the form of table as an array. Alternatively, the relationship can be stored in the form of character strings or other data formats as formulae of Boolean algebra. The disjunctive canonical form and the conjunctive canonical form are well known as canonical forms of Boolean algebra. However, any other form may be used.

As described above, a transition table representing a sequential machine model and a table representing a set of initial states can be also represented as a state transition diagram shown in FIG. 11. Accordingly, another data format that can store the state transition diagram may be used to store the relationship. For example, data representing the state and label may be expressed as a record ("Structure" in C language) and a record that is a target of a state transition may be pointed by a pointer variable.

Subsequently, the controllable simulation relation is computed at step 305 shown in FIG. 1.

As used herein, the controllable simulation relation has a formula of Hmax defined in Non-Patent Document 1. The controllable simulation relation computing unit 407 computes the controllable simulation relation Hmax from the control specification model stored in the control specification model storage unit 406 and the control target model stored in the control target model storage unit 403.

FIGS. 12A and 12B are diagrams quoted from Non-Patent Document 1. FIG. 12A illustrates a control system to be designed. In FIG. 12A, M1 represents an FSM of the control target and M2 represents an FSM of the control apparatus. v represents an extraneous input signal that is generated outside of the control system, y represents a control output delivered from the control target, and u represents a control input inputted into the control target.

The v, y, and u correspond to v, y, and u shown in FIG. 3, respectively.

FIG. 12B illustrates a control specification. A model of the control specification is an FSM denoted by a reference symbol "M". In Non-Patent Document 1, the goal is to generate M2 from the control system including M1 and M2 connected to each other as shown in FIG. 12A so that M2 has a simulation relation with the control specification M. It should be noted that the FSMs in Non-Patent Document 1 are all sequential machines.

Referring to Non-Patent Document 1, the controllable simulation relation Hmax is expressed as follows:

$$(s_1, s) \in Hmax \Leftrightarrow \left\{ \forall v \exists u \forall y \forall s_1' \left[ \left( s_1 \xrightarrow{u/y} M1 \ s_1' \right) \Rightarrow \exists s' \left[ \left( s \xrightarrow{v/y} M \ s' \right) \land (s_1', s') \in Hmax \right] \right] \right\} \quad (1)$$

where $$s_1 \xrightarrow{u/y} M1 \ s_1' \quad (2)$$

indicates a transition relation in that M1 can make a transition from state s1 to state s1' with the input u and the output y, and $$s \xrightarrow{v/y} M \ s' \quad (3)$$

indicates a transition relation in that M can make a transition from state s to state s' with the input v and the output y.

As can be seen from this definition, Hmax represents a relationship between the state of M1 and the state of M. Although no name is assigned to Hmax in Non-Patent Document 1, Hmax is referred to as "controllable simulation relation" in this embodiment, as described above.

It can be determined whether a control is available or not by using the controllable simulation relation. Let r1 be the initial state of M1 and let r be the initial state of M. If the set (r1, r) is included in the controllable simulation relation, the control that satisfies the control specification is available. In contrast, if the set (r1, r) is not included in the controllable simulation relation, the operation of the control system might deviate from the operation specified by the control specification regardless of whatever FSM is applied to the control apparatus.

The controllable simulation relation computing unit 407 computes Hmax from the control specification model stored in the control specification model storage unit 406 and the control target model stored in the control target model storage unit 403 according to formula (1). In this formula, M corresponds to the control specification model and M1 corresponds to a control target model. The controllable simulation relation Hmax represents a relationship between the state of the control target model and the state of the control specification model. The computed controllable simulation relation is stored in the controllable simulation relation storage unit 408.

A table shown in FIG. 13 illustrates the controllable simulation relation of this example. The state of the control target model is represented by a variable s which takes the value of "0" or "1". While, the state of the control specification model is represented by variables x0 and x1, each of which takes the value of "0" or "1". Accordingly, the state of the control specification model has four states. FIG. 13 illustrates all the combination of the states (i.e., the values of the variables s, x0, and x1) that satisfy the controllable simulation relation.

Subsequently, the permissible operation model generating unit 409 generates a permissible operation model Mc from the controllable simulation relation Hmax stored in the controllable simulation relation storage unit 408, the control specification model M, and the control target model M1 (step 308 shown in FIG. 1).

The permissible operation model Mc is referred to as a "maximal controller". The permissible operation model Mc includes an FSM model M2 of the control apparatus.

The permissible operation model is an FSM. The transition relation of the permissible operation model can be obtained by computing the following formula (4) (this formula is also defined in Non-Patent Document 1):

$$\left( (s_1, s) \xrightarrow{(v,y)/u} M_c \ (s_1', s') \right) \Leftrightarrow \left[ \begin{array}{c} \left( \left( s_1 \xrightarrow{u/y} M_1 \ s_1' \right) \land \left( s \xrightarrow{v/y} M \ s' \right) \right), \\ \text{and } (s_1', s') \in Hmax \end{array} \right] \quad (4)$$

Here, M1 corresponds to the control target model, M corresponds to the control specification model, and Mc corresponds to the permissible operation model. Additionally, the initial state of the permissible operation model is provided by Non-Patent Document 1 as follows:

$$r_c = (r_1, r) \quad (5)$$

In other words, the initial state of the permissible operation model equals to a pair of the initial state r1 of the control target model and the initial state r of the control specification model. If this initial state is not included in the controllable simulation relation, a control system that satisfies the control specification cannot be provided. Accordingly, the automatic design apparatus notifies that information to the designer and the operation of the automatic design apparatus is completed.

This determination is made at the controllability determining step (step 306) shown in FIG. 1. The uncontrollability is notified to the designer at uncontrollability notifying step (step 307).

If this initial state is included in the controllable simulation relation, the obtained permissible operation model is stored in the permissible operation model storage unit 410.

The definition of the permissible operation model Mc in formula (4) is analogous to the synthesis of the control target model M1 with the control specification model M. Like the synthesis of M1 with M, the state of Mc is represented as a pair of the state of M1 and the state of M. However, the state of Mc is different from the normal synthesis in that, in the definition of the transition relation, the states of destination nodes of allowable transitions should be included in the controllable simulation relation Hmax.

In other words, it can be said that the permissible operation model Mc is a model generated by imposing a constraint condition of the controllable simulation relation Hmax on the synthesis model (i.e., control apparatus synthesis model) in which the control target model M1 is composed with the control specification model M.

FIGS. 14A and 14B illustrate the permissible operation model Mc of this example, where FIG. 14A illustrates the transition relation and FIG. 14B illustrates the set of initial states.

The transition relation shown in FIG. 14A is obtained by composing the transition relation of the control target model M1 (see FIG. 6A) and the control specification model M (see FIG. 10A) and subsequently by extracting the set of data that satisfies the next state provided by the controllable simulation relation Hmax (see FIG. 13) (i.e., (s, x0, x1)=(0, 0, 0), (0, 0, 1), (0, 1, 0), and (1, 1, 1)).

The initial state shown in FIG. 14B is a pair of the initial state of the control target model M1 (see FIG. 6B) and the control specification model M (see FIG. 10B).

The goal of this embodiment is to obtain the control apparatus model M2 that satisfies the control specification model M. Non-Patent Document 1 indicates that the necessary and sufficient condition for obtaining the control apparatus model M2 that satisfies the control specification model M is that the control apparatus model M2 simulates the permissible operation model Mc.

This simply means that "M2=Mc" is allowed (i.e., the permissible operation model Mc may be considered to be the control apparatus model M2). Additionally, this means that there is a possibility of reducing the operation range of the control apparatus model M2 as long as the control apparatus model M2 simulates the permissible operation model Mc. That is, there is a possibility of further reducing the scale of the control apparatus model M2 from the scale of the permissible operation model Mc.

Subsequently, the control rule determining unit 411 determines a control rule from the permissible operation model Mc stored in the permissible operation model storage unit 410. The control rule indicates a method for generating a control input u from the state of the control apparatus. The control rule can be expressed as a function that computes u from the state of the control apparatus.

A method for generating a control rule is now herein described. From the transition relation table of the permissible operation model Mc shown in FIG. 14A, the entries for the variables S', x0', and x1', which represent the next states, are deleted, first. Additionally, since the control input u is not directly dependent on the control output y (however, dependent on the state s of the control target), the entry for y is also deleted. As a result, a table shown in FIG. 15 can be obtained that indicates the control rule of the control apparatus. The variables remaining in the table of FIG. 15 excluding the control input u and the extraneous signal v (i.e., s, x0, and x1) serve as state variables of the control apparatus. That is, flip-flops inside the control apparatus are finally generated from the state variables.

Here, the states of the control apparatus that do not appear in this table are states that do not appear during the operation of the control system. Accordingly, these states are negligible when generating a combinational circuit for generating a control input. In addition, when a plurality of values of the control input u correspond to a specific state of the control apparatus, any one of these values can be used. By using this characteristic, the table of the control rule (corresponding to FIG. 15) can be reduced.

However, in this example, as shown in FIG. 15, the values of control input u have one-to-one correspondence to the combinations of v, s, x0, and x1. Therefore, in this example, the control rule cannot be reduced by using that characteristic.

Subsequently, the control apparatus model generating unit 412 generates the control apparatus model M2. The control apparatus model M2 refers to a model obtained by restricting the operation of the permissible operation model Mc using the control rule determined by the control rule determining unit 411. More specifically, a logical AND of the transition relation of the permissible operation model Mc (see FIG. 14A) and the control rule (see FIG. 15) is defined as the transition relation of the control apparatus model M2.

Additionally, a logical AND (or intersection) of the initial state (or the set of the initial states) of the permissible operation model Mc (see FIG. 14B) and the controllable simulation relation Hmax (see FIG. 13) is defined as the initial state (or set of the initial states) of the control apparatus model M2. It is noted that the control output y, which is the output of the control target, and the extraneous signal v serve as inputs to the control apparatus while the control input signal u, which is an input to the control target, serves as an output from the control apparatus.

The control apparatus model M2 of this example determined by the control apparatus model generating unit 412 using the above-described technique is illustrated in FIGS. 16A and 16B. In this example, when determining the control rule, a plurality of control inputs u do not correspond to the same state, as described above. As a result, the control apparatus model M2 (see FIGS. 16A and 16B) is identical to the permissible operation model Mc (see FIGS. 14A and 14B).

In general, when a control rule is fixed to the appropriate value of available control input signals u, state transitions caused by only the other values of the control input signals u are removed from the control apparatus model. Thus, the control apparatus model M2 whose scale is smaller than that of the permissible operation model Mc can be generated.

Since such control apparatus model M2 is a model represented as a finite state machine (transition relation and initial state shown in FIGS. 16A and 16B), the control apparatus model generating unit 412 further converts this model to a model written in a design description language, such as the Verilog language.

The design data output unit 413 outputs the control apparatus model M2 written in the design description language as design data of a control apparatus circuit. In this example, as shown in FIG. 17, the output written in the Verilog language can be obtained.

In FIG. 17, lines 27 to 35 describe a section that determines the output to the control input signal u. This section is generated from the control rule described in FIG. 15. The comparison between FIG. 17 and FIG. 15 clearly tells the correspondence relationship between the section and the control rule.

By inputting the design data of the control apparatus obtained using the above-described technique (i.e., data written in the Verilog language) into a logic synthesis tool, a digital circuit can be generated.

Referring back to the control rule determining unit 411, the control rule determining unit 411 determines a function to find u from v, s, x0, and x1. Such a function corresponds to a Boolean formula from the point of view of algebra and corresponds to a combinational circuit from the point of a circuit, not a sequential circuit that requires a flip-flop.

To simplify a Boolean algebra (i.e., to simplify a combinational circuit), a variety of methods is known. For example, many textbooks of a logical circuit design describe a method for acquiring a simple circuit by using the Karnaugh map. To systematically simplify a circuit, the Quine-McClusky method can help. Some methods are proposed that are applicable to a large-scale circuit. For example, the ESPRESSO is well known. Such simplifying means is included in commercially available logic synthesis tools. Thus, a circuit can be automatically simplified without any user intervention. In general, these means are used to reduce the number of gates and transistors in a circuit.

The control rule determining unit 411 can employ such a simplifying method. Suppose that, for example, the following equation (6) can be obtained by applying the simplifying method to the control rule shown in FIG. 15. The obtained value of u computed from (v, s, x0, and x1) using this equation is not contradictory to the values in FIG. 15, and therefore, this equation can be used as a control rule:

$$u = (v \wedge x0) \oplus s \qquad (6)$$

where $\oplus$ represents exclusive OR. This equation indicates that only three variables are required to generate u. Since "v", which is one of the variables, represents an extraneous signal, only x0 and s are required as state variables. Consequently, if equation (6) is employed as a control rule, the definition of x1 and the computation to update the value of x1 can be eliminated.

Figures 18A, 18B:
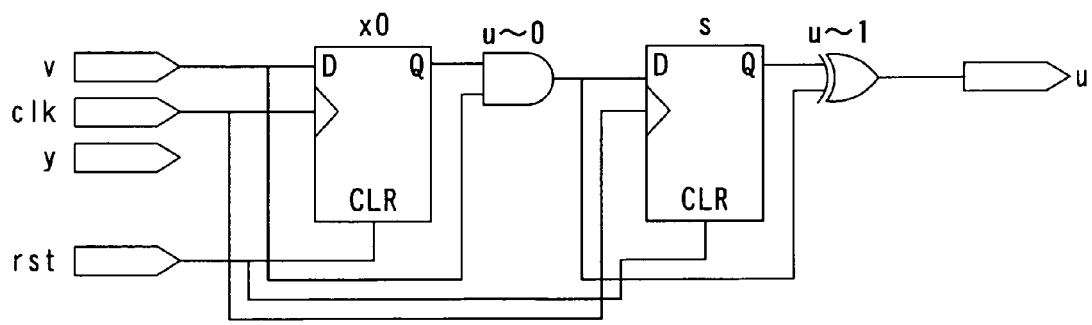
FIGS. 18A and 18B are second diagrams illustrating the control apparatus model of the example written in the Verilog language.

The resultant design data of the control apparatus is shown in FIGS. 18A and 18B. FIG. 18A' illustrates a description written in the Verilog language while FIG. 18B illustrates a circuit diagram of a circuit obtained by logic-synthesizing the description shown in FIG. 18A.

The design data shown in FIG. 17 includes three flip-flops (three state variables: s, x0, and x1), while the design data shown in FIG. 18A includes only two flip-flops (two state variables: s and x0). That is, by applying the simplifying means to the control rule determining unit 411, the number of flip-flops is reduced. Although the simplifying means is provided to simplify a combinational circuit and does not usually reduce the number of flip-flops, the number of flip-flops can be reduced when the simplifying means is applied to the control rule determining unit 411.

Figure 19:
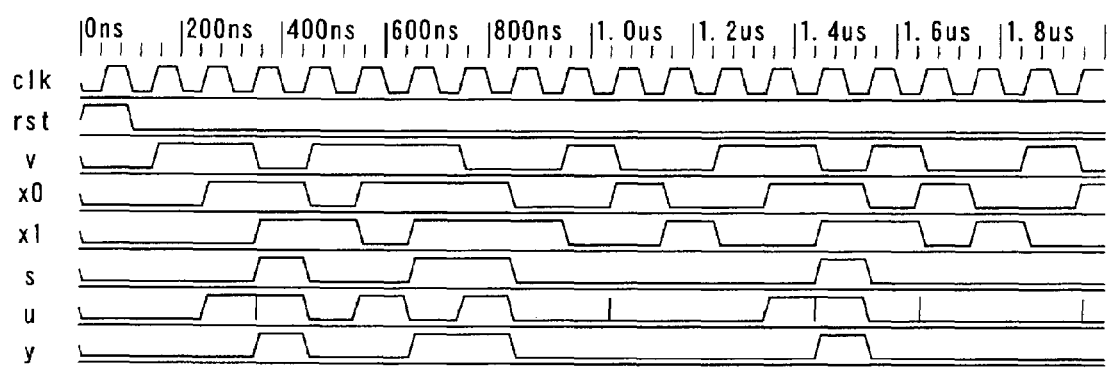
FIG. 19 is a timing diagram of a signal obtained by combining the control apparatus model with the control target model of the example and by simulating the combined model.

FIG. 19 illustrates the waveform of a signal obtained by synthesizing the data (design data of the control apparatus written in the Verilog language) shown in FIG. 18A with the data (design data of the control target written in the Verilog language) shown in FIG. 9A and simulating the synthesized data.

The comparison between FIG. 19 and FIG. 8 (simulation result of the control specification) indicates that the control system works as defined in the control specification.

The target of simplifying a circuit described here is only a control apparatus. If the control target is hard IP or an FSM modeled from a mechanical control target that contains, for example, a motor, the configuration cannot be changed. Accordingly, the circuit is simplified only for the control apparatus. However, if the control target is soft IP and is to be logic-synthesized, the control apparatus and the control target together can be simplified. If the entire control system is a target of simplification, further performance improvement can be expected, such as reduction of the circuit scale and speed-up of the operation. In this example, since the control specification shown in FIGS. 5A and 5B is simple and is available for logic synthesis, it might be difficult for a reader to understand why the simplification of the entire system is required. However, in general, the present invention can be applied to a case where a control specification has not a format that cannot be logic-synthesized or a case where a control specification is not as simple as the control specification shown in FIGS. 5A and 5B. Accordingly, the simplification of the entire system has a benefit.

Also, in this example, the extraneous signal v, the control output signal y, and the control input signal u are all 1-bit signals. However, the present invention is applicable as in the above-described example even when these signals are multi-bit signals. The reason why the 1-bit signals are employed in this example is to reduce the size of the accompanying drawings.

According to the first embodiment, an automatic design apparatus, an automatic design method, and an automatic design program of a digital circuit can bring the generating method of a control apparatus described in Non-Patent Document 1 into shape. In addition, by simplifying a control rule to generate the control input signal u, the scale of the control apparatus can be reduced.

3. Second Exemplary Embodiment

Figure 20:
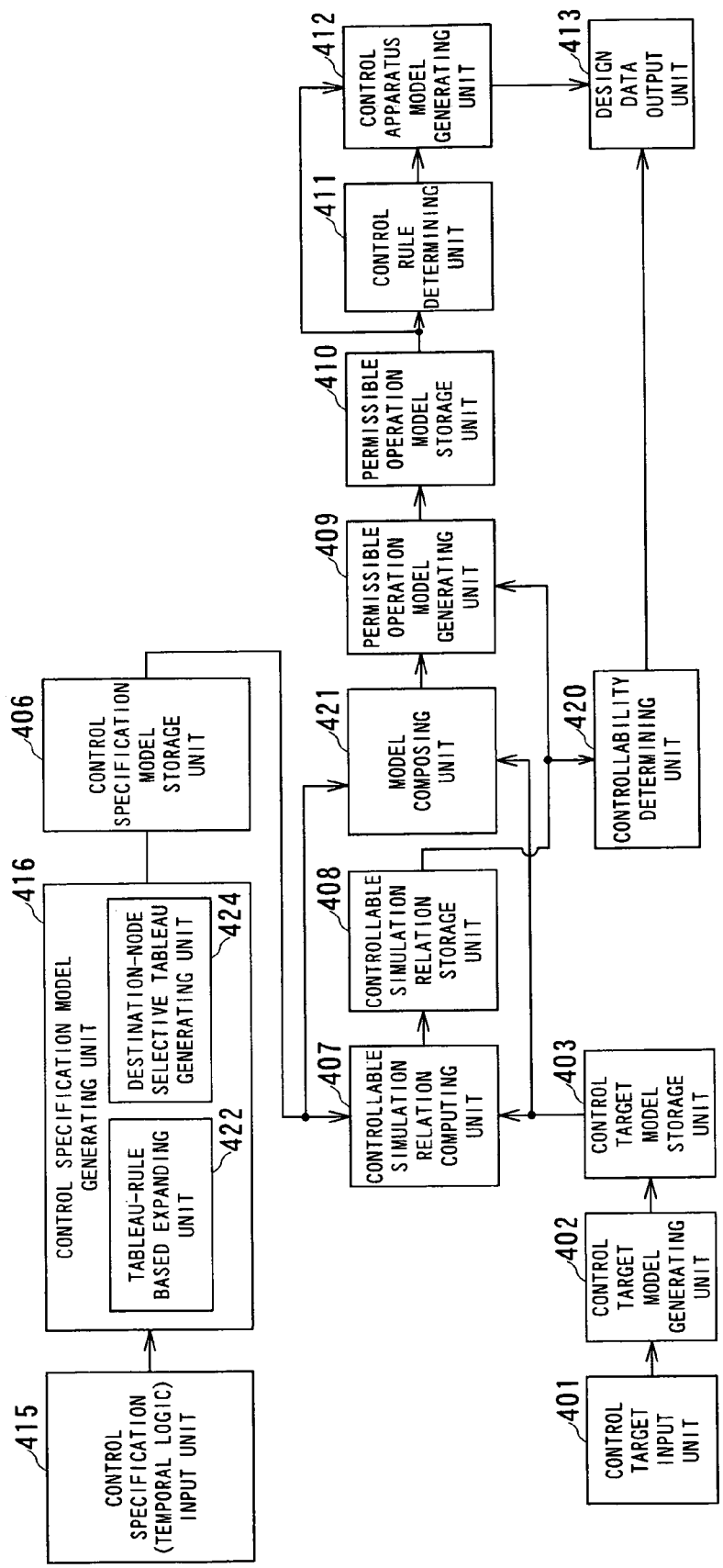
FIG. 20 illustrates an exemplary configuration of the automatic design apparatus of a digital circuit according to a second embodiment of the present invention.

FIG. 20 is a block diagram of an automatic design apparatus of a digital circuit according to a second exemplary embodiment of the present invention. The second embodiment differs from the first embodiment in the following two respects: the format of input control specification and the conversion method of the format.

In the first embodiment, a specification of a sequential circuit (see FIG. 5A) is input as a control specification and is converted into the control specification model M (see FIGS. 6A and 6B). In contrast, in the second embodiment, a control specification written in a temporal logic is input and is converted to the control specification model M.

Control specification (temporal logic) input unit 415 shown in FIG. 20 also receives a control specification written in a temporal logic.

Control specification model generating unit 416 includes tableau generating unit (destination-node selective tableau generating unit) 424, which converts a control specification written in a temporal logic to a control specification model represented by a finite state machine. That is, it can be said that the configuration shown in FIG. 20 is generated by specializing the configuration shown in FIG. 2. However, the automatic design apparatus according to the second exemplary embodiment is characterized in that the control specification (temporal logic) input unit 415 can accept a control specification based on a temporal logic and the control specification model generating unit 416 can generate the control specification model M having properties suitable for the present invention from properties (control specification) expressed using a temporal logic. These two characteristics are now herein described with reference to FIG. 20.

The second exemplary embodiment is also described with reference to a specific example. The example includes a control system and a control target similar to those in the first exemplary embodiment. That is, the configuration of the control system is illustrated in FIGS. 3A and 3B and the control target is illustrated in FIGS. 9A and 9B.

The control specification is illustrated in FIG. 21. This control specification is written in a language known as PSL. The values in the left of FIG. 21 are line numbers and are not related to the control specification.

As described above, PSL is a temporal logic-based property description language. Line 1 of FIG. 21 indicates that this control specification corresponds to a module "control_system". As described in relation to FIGS. 3A and 3B, "control_system" represents the entire control system. Line 2 of FIG. 21 indicates that "clk" is a clock of this module and the module is activated by the positive edge of the clock "clk". The condition that signals should satisfy is indicated by line 3 of FIG. 21. This condition is expressed by using temporal logic formula as follows:

$$G(v \wedge XXy) \quad (7)$$

Formula (7) indicates a condition that, at any point of time, the truth-value v equals to the truth-value of y at the second next clock. As used herein, the term "any point of time" refers to each step of a time separated by the clock. In a temporal logic, the symbol "X" represents the next point of time while the symbol "G" represents "any point of time".

The control specification (temporal logic) input unit 415 receives such a control specification, which is delivered to the control specification model generating unit 416. The control specification model generating unit 416 converts the control specification written in a temporal logic to a control specification expressed as a finite state machine (FSM) in the following manner.

Before starting the description, for the sake of convenience of description, a tableau is created in the same manner as known technology, first. As used herein, the term "tableau construction" refers to generation of an FSM from a temporal logic formula. The generated FSM is referred to as a "tableau". The tableau construction is described in, for example, Non-Patent Document 3.

By using a tableau rule shown in, for example, Non-Patent Document 3, formula 7 can be expanded into elementary subformulas. As a result of the expansion, formula 7 can be expanded into an expression including five elementary subformulas v, y, Xy, XXy, and $XG(v \Leftrightarrow XXy)$. The elementary subformula starting with a temporal operator X is referred to as a next time subformula.

As shown in FIG. 22, five current state variables v, y, x0, x1, and tg are assigned to the five elementary subformulas. Additionally, v', y', x0', x1', and tg' are assigned to the corresponding next state variables.

Tableau-rule based expanding unit 422 shown in FIG. 20 expands a temporal logic formula into elementary subformulas on the basis of the tableau rule and assigns current state variables and next state variables to the elementary subformulas (i.e., generates the table shown in FIG. 22 from the temporal logic formula).

Among these elementary subformulas, three next time subformulas have the symbol "X". These subformulas satisfy the following transition relations:

$$Xy \Leftrightarrow y' \text{ i.e., } x1 \Leftrightarrow y' \quad (8)$$

$$XXy \Leftrightarrow xy' \text{ i.e., } x0 \Leftrightarrow x1' \quad (9)$$

$$XG(v \Leftrightarrow XXy) \Leftrightarrow XG(v' \Leftrightarrow XXy') \wedge (v' \Leftrightarrow XXy') \text{ i.e.,}$$
$$tg \Leftrightarrow tg' \wedge (v' \Leftrightarrow XXy') \quad (10)$$

When these transition relations are integrated using a logical AND, the following formula is given:

$$(x1 \Leftrightarrow y') \wedge (x0 \Leftrightarrow x1') \wedge (tg \Leftrightarrow tg' \wedge (V' \Leftrightarrow XXy')) \quad (11)$$

FIG. 23 summarizes the combinations of a current state variable and a next state variable that make formula (11) true. As can be seen from formula (11), the current state variables v and y are not related to the transition relation. Therefore, the current state variables v and y are eliminated from FIG. 23. FIG. 23 illustrates the transition relation of the tableau.

The initial state of the tableau is expressed as the formula:

$$tg \wedge (V \Leftrightarrow XXy) \quad (12)$$

FIG. 24 illustrates a set of initial states of the tableau. FIG. 24 summarizes the sets of state variables that make formula (12) true.

It is noted that, as can be seen from formula (12) or FIG. 24, the value of tg is 1 (true) in each initial state. It is also noted that, as can be seen from formula (12) or FIG. 23, the next state that is a destination node of a transition from the current state having a value of 1 (true) always has tg' of a value of 1 (true). That is, tg is always 1. In this point of view, tg is redundant.

In general, when representing a property which begins with "G" or "AG" in a temporal logic (this property corresponds to a keyword "always" in the PSL), such a redundant state variable appears. This type of property is frequently used. Accordingly, by regarding such a variable to be 1 and to be negligible, the amount of data can be reduced when storing the data as shown in FIG. 23. However, to present normal cases, such a specific process is not carried out in this example. Therefore, even when tg=0, tg appears in FIG. 23.

Figure 25:
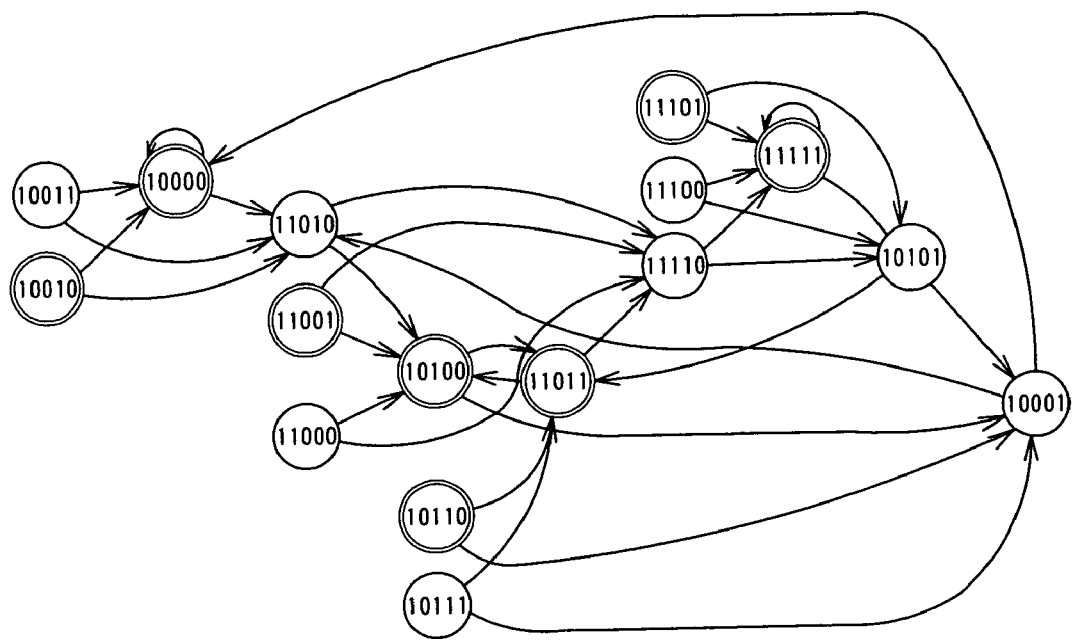
FIG. 25 illustrates the control specification model in the form of a Kripke structure (state transition diagram) according to the second embodiment.

FIG. 25 illustrates a state transition diagram representing the transition relation of tableau shown in FIG. 23 and the set of initial states shown in FIG. 24. In FIG. 25, for the sake of simplicity, the states in which tg=0 (false) are eliminated.

In FIG. 25, a node indicated by a circle denotes the state and an arrow between nodes denotes the transition relation. A number string in the node denotes the values of the state variables. Five digits of the Boolean value represent tg, tx0, tx1, v, and y from the left. A node indicated by a double circle denotes the state included in the set of initial state transition (i.e., state that can be the initial state).

The truth table and the initial states representing the transition relation shown in FIGS. 23 and 24 and the state transition diagram shown in FIG. 25 are all tableaus represented as a Kripke structure.

Subsequently, the tableau is converted to the format of a sequential machine. To the eyes, a difference between a Kripke structure and a sequential machine appears as whether the state transition diagram has a transition label. That is, a sequential machine represents that a transition is effected by the values of inputs and outputs using a transition label, whereas a Kripke structure has no concept of inputs and outputs and has no transition label. Briefly speaking, to convert a Kripke structure to a sequential machine, a state transition diagram of a Kripke structure is generated first. Subsequently, a transition label corresponding to the input and output values is added to an arrow of a state transition. In the most commonly used method, a transition label representing "input/output" is added to an arrow of a state transition. In this example, the current state "v/y" is added as a label.

Figure 26:
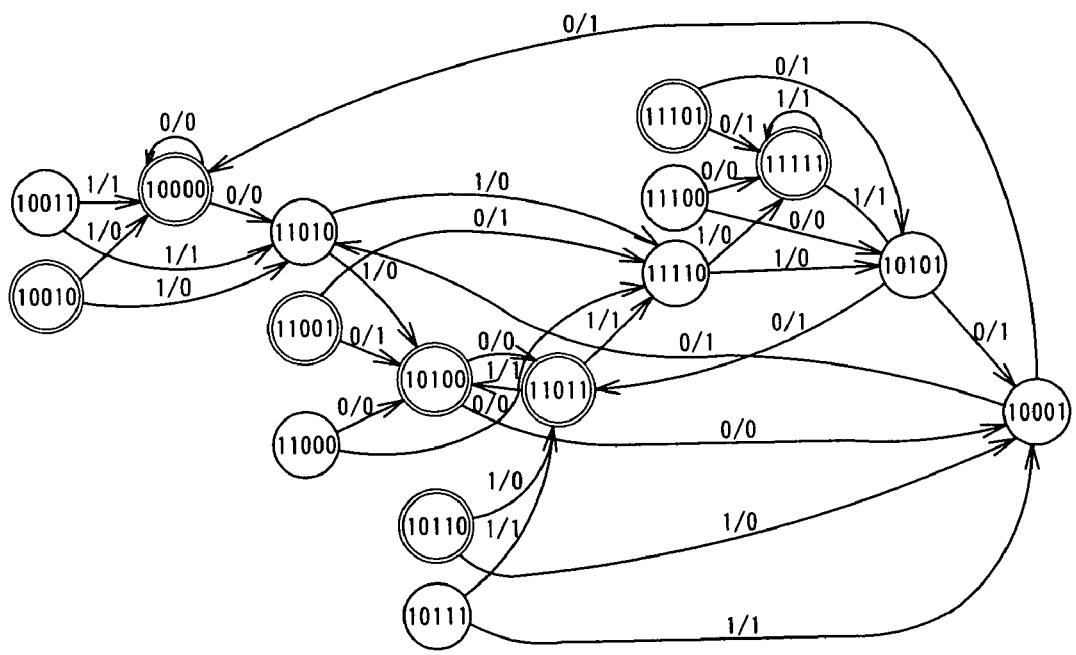
FIG. 26 illustrates a specific example of the control specification model in the form of a conventional tableau (Kripke structure)

This method is applied to FIG. 25. The result is shown in FIG. 26. Since v is an extraneous input signal and y is a control output, a state transition has a label having a format "v/y", which is "input/output". As described above, the state shown in FIG. 25 is represented by a 5-digit number and the digits correspond to tg, tx0, tx1, v, and y from the left. Accordingly, the last 2 digits of the 5-digit number representing the state directly correspond to the transition label of the state.

However, even when the present invention is applied to the control specification model shown in FIG. 26, the desired result cannot be obtained. That is, even when the same method as that of the first embodiment which provides a correct result is applied to the control specification model shown in FIG. 26, a control system that satisfies the given control specification shown in FIG. 21 cannot be obtained. The reason is as follows.

As shown in FIG. 26, all the available transitions starting from a state "10010" have a label "1/0". All the available transitions starting from a state "10011" have a label "1/1". That is, for a transition starting from some state, the input and output is determined to some specific value depending on the state. This is natural because, for the conversion from a Kripke structure to a sequential machine, the conversion method is determined according to the above-described method (a transition label attaching method).

However, according to the present invention, the relation of the control specification model to the operation of the control system is not defined by a language inclusion relation, but is defined by a simulation relation based on Non-Patent Document 1. Accordingly, a different operation of the obtained control apparatus appears depending on how the state and the state transition are defined. For the state machine converted from the Kripke structure using the above-described method, the technique of determining the state and the state transition is not appropriate as a control specification model. As a result, the computation of the controllable simulation relation is affected.

The controllable simulation relation corresponds to Hmax in formula (1). Also, the control specification model corresponds to M in formula (1). Formula (1) includes the universal qualification with respect to the extraneous signal v. If a control specification model is generated from a Kripke structure using the above-described method, the value of the extraneous signal v when a transition occurs from a given state is determined to be a specific value depending on the state. Accordingly, if a universal qualifier calculation $\forall v$ is carried out for formula (3) representing the transition relation of the control specification model, the value is determined to be false. This nature affects the computation of formula (1). If a control specification model is generated using the above-described method, the operation different from the original intension occurs when carrying out a universal qualifier calculation. As a result, an unexpected result occurs.

In another point of view, this is because the sequential machine shown in FIG. 26 is nondeterministic. Therefore, by computing the controllable simulation relation after converting the sequential machine shown in FIG. 26 to a deterministic sequential machine, this problem can be addressed. However, in general, a large amount of computing time and a large amount of memory capacity are required to convert a nondeterministic sequential machine to a deterministic sequential machine. In addition, when converting a nondeterministic model to a deterministic model, additional state variables are required to encode the states of the deterministic model. Therefore, this technique is not suitable for implementation with the BDD. According to the present invention, one of the main reasons why a simulation relation is employed to define the relation between the operation of a control system and the control specification model is to reduce the large amount of the computing time and the required memory capacity that are required for the method using a language inclusion relation. If the model is converted to a deterministic model, the advantage of the present invention is deteriorated. Accordingly, it is desirable that this conversion is avoided.

As described above, in the case of converting a Kripke structure to a sequential machine, if a sequential machine is generated such that a transition label to be added to a state transition from a given state equals to the values of a basic proposition variable (input v, output y) contained in that state, an unexpected result occurs.

In this embodiment, a tableau construction method is employed that addresses the above-described problem. This tableau construction method is now herein described. Before starting the description, the result of this method when applying this method to FIG. 25 is illustrated in FIG. 27.

In FIG. 27, in the case of converting a Kripke structure to a sequential machine, a transition label is added to a state transition so that the transition label equals to the values of a basic proposition variable (input v, output y) contained in the state of a destination node, not in the state of a source node. In addition, a new state "init" is introduced as an initial state.

As used herein, a tableau (sequential machine in this example) that has a different next state depending on the input and output value is referred to as a "destination-node selective tableau". For description purpose, a conventional tableau is referred to as a "conventional tableau (Kripke structure)".

In FIG. 26, the transition label is attached such that the transition label equals to the values of a basic proposition variable contained in the state of a source node, not in the state of a destination node. As described above, the state variable is represented by a 5-digit number and the last 2 digits of the 5-digit number correspond to v and y (i.e., input v and output y). The transition label of the state is expressed as "v/y". In FIG. 26, for example, the transition label for a transition from a state A to a state B is "$v_A/y_A$" using the input and output $v_A$ and $y_A$ of the state A (i.e., source node). In contrast, in FIG. 27, the transition label for a transition from a state A to a state B is "$v_B/y_B$" using the input and output $v_B$ and $y_B$ of the state B (i.e., destination node). From the viewpoint of a sequence of only the input and output of transition states, the sequence in FIG. 26 is the same as that in FIG. 27. That is, the states in FIG. 26 are equivalent to the states in FIG. 27 in terms of the language inclusion relation. However, in the states shown in FIG. 26, the value of input and output is determined by the current state and the next state is not effected by the value of input and output. Therefore, the state shown in FIG. 26 is not a destination-node selective tableau.

The reason why the destination-node selective tableau does not cause the problem about the universal calculation is now herein described. In FIG. 27, the state "10010" allows two types of transitions: a transition to the state "10000" having a label "0/0" and a transition to the state "11010" having a label "1/0". That is, a transition from the state "10010" is defined for two cases: a case where the extraneous signal v is "1" and a case where the extraneous signal v is "0". Therefore, unlike the sequential machine obtained by using a conventional tableau construction method, the phenomenon that the result of the universal qualifier calculation ∀v is always false does not occur. This characteristic can prevent the unexpected result of the computation of the uncontrollable simulation relation.

It is noted that the state machine shown in FIG. 27 is redundant. In other words, this state machine can be contracted. The result of the contraction is shown in FIG. 28. In FIG. 28, the state code corresponds to tg, tx0, and tx1 from the left.

The reason why the state machine can be contracted can be described from the definition of the conventional tableau, from which the destination-node selective tableau is derived. The transition relation of the conventional tableau depends on the next state proposition. However, in the current state variables, a variable (v, y) corresponding to the atomic proposition (input and output) does not have an effect on the transition relation. In this example, it can be seen from formula (11) that the next state proposition variables of the current state tg, tx0, and tx1 have an effect on the transition relation, but the input and output v and y do not have an effect on the transition relation.

This is described in more detail with reference to FIG. 27. The current state "10010" is changed to the next state "11010" by the transition "1/0". Also, the current state "10010" is changed to the next state "10000" by the transition "0/0". However, a careful look indicates that the four states "10000", "10001", "10010", and "10011" are changed to the same next state by the same input and output. That is, to determine transition relation, first three bits of the next state proposition variable are sufficient. The last two bits (v, y), which serve as atomic proposition variables, are negligible. It follows that, for a transition destination selective tableau, only the next state proposition code is required as a state variable and a state variable corresponding to the atomic proposition is not required to be stored. In FIG. 27, the current state "10010" is changed to the next state "11010" by the transition "1/0". At that time, by storing only the first three bits "110" corresponding to the next state proposition variable, no problem occurs in the subsequent transitions. Although the basic proposition variable formed from the last two bits "10" correspond to the transition "1/0", the basic proposition variable does not have an effect on the subsequent state transitions. In other words, although the input and output value have an effect on the selection of the next state at the moment of the state transition, the input and output value is not required to be stored once the next state is determined.

On the basis of the above-described consideration, by contracting the states in the state transition diagram shown in FIG. 27 while removing an atomic proposition from the state variables, the state transition diagram shown in FIG. 28 can be obtained. For example, the four states "10000", "10001", "10010", and "10011" are contracted into one state "100".

In this example, the state transition diagram shown in FIG. 28 can be rewritten into the state transition diagram shown in FIG. 29 by further removing the state "init". This rewriting is immediately possible if the original control specification has the format of ". . . is satisfied at any point of time". This is because, from the nature of the control specification, even when the state that is the destination of the transition from the initial state "init" is considered to be the starting point, the same condition ". . . is satisfied at any point of time" is still satisfied. Therefore, when the state transition diagram shown in FIG. 28 is rewritten while considering the states to be initial states, the state transition diagram shown in FIG. 29 can be obtained. Since the condition ". . . is satisfied at any point of time" is derived from the keyword "always" in line 3 of FIG. 21 or the operator "G" in formula (7), it can be easily determined whether a control specification can be rewritten as described above.

The foregoing description is made with reference to a state transition diagram. The table representation of the transition relation shown in FIG. 29 is illustrated in FIG. 30. It is noted that, although FIG. 29 does not include the case where tg=0 (since FIG. 25 does not originally include that case), FIG. 30 includes that case.

FIG. 31 illustrates a table representing the initial states. The table indicates that tg is 1, and each of tx0 and tx1 may be either 1 or 0.

The destination-node selective tableau generating unit 424 shown in FIG. 20 carries out the process to generate the destination-node selective tableau shown in FIG. 31 (or FIG. 29) from the Kripke structure shown in FIGS. 23 and 24 (or FIG. 25).

The comparison between FIG. 30 and FIG. 23 indicates that the tables are basically the same although the entries for the next state basic proposition variables v' and y' in the original tableau are replaced with the entries for v and y in the destination-node selective tableau.

That is, the above-described destination-node selective tableau can be generated by the similar steps to those of the known tableau construction. By changing the manipulation of atomic propositions, a tableau having a different characteristic from that of the known tableau can be obtained. Thus, the goal of the present invention can be achieved.

When viewed from the standpoint of this idea, a partly modified method for constructing a known tableau can be applied as a method for constructing a destination-node selective tableau according to the present invention. This method is now herein described while comparing it to the known method.

Figure 32:
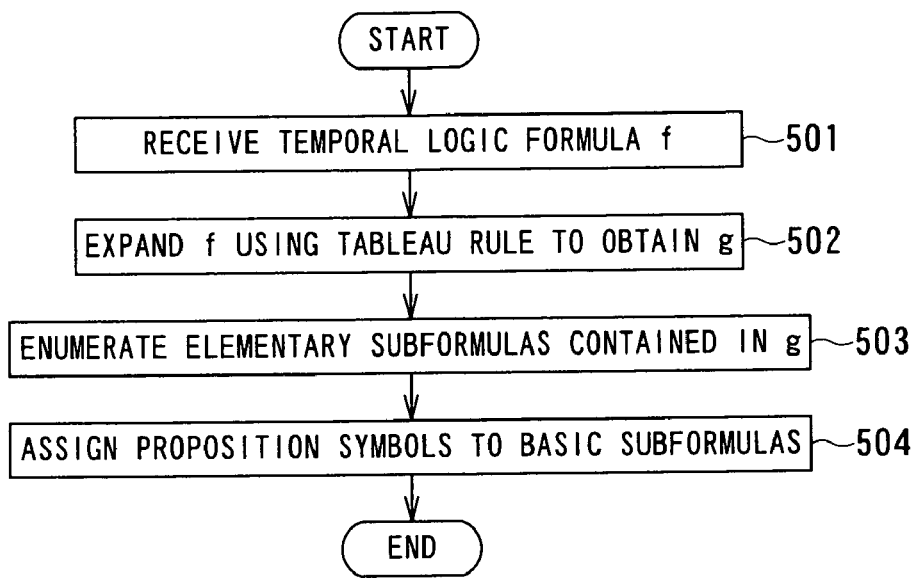
FIG. 32 is a flow chart of a technique for finding a state variable in a conventional tableau construction method.

Methods for finding a state variable are compared first. FIG. 32 is a flow chart of a technique for finding a state variable in a conventional tableau construction method.

At step 501, a temporal logic formula f is input. At step 502, the temporal logic formula f is expanded to obtain an expansion formula g. At step 503, elementary subformulas contained in the expansion formula g are enumerated. Finally, at step 504, proposition symbols are assigned to the elementary subformulas. The relation between the obtained formulae and the obtained proposition symbols (the current state variables and the next state variables) is shown in FIG. 22.

Figure 33:
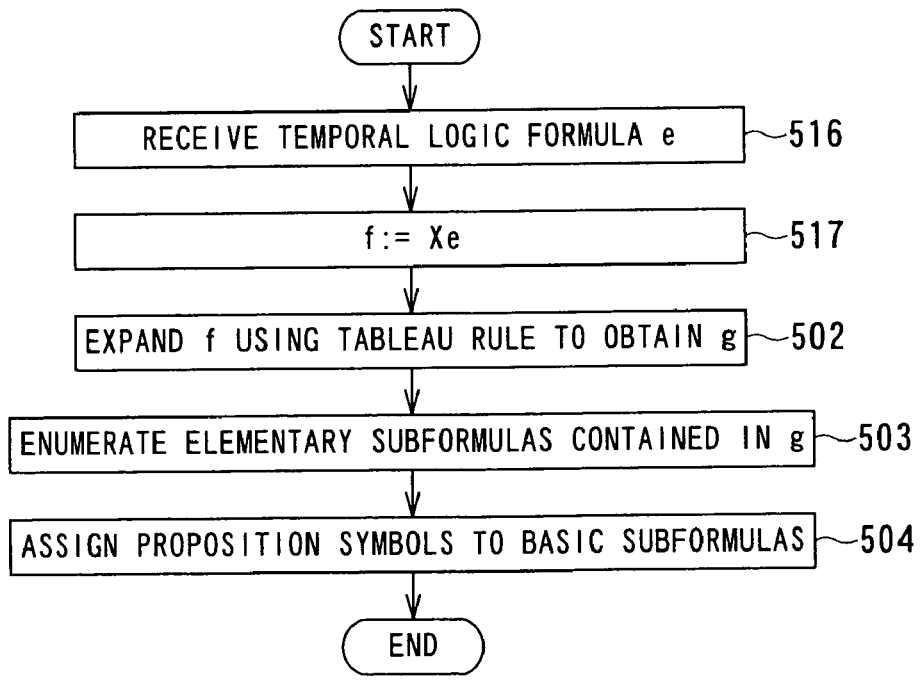
FIG. 33 is a flow chart of a technique for finding a state variable in a tableau construction method according to the second embodiment.

In contrast, according to this embodiment, the technique for finding the state variables in the conventional tableau construction method shown in FIG. 32 is changed to that shown in a flow chart of FIG. 33.

Step 501 in the conventional technique shown in FIG. 32 is modified to steps 516 and 517 according to this embodiment.

At step 517, a temporal logic operator X is added to a temporal logic formula e received at step 516. This operation corresponds to a process to add a state "init". However, this method has an advantage over a method for simply adding a state "init" in that the number of states is not increased for a temporal logic formula starting with "G".

Subsequently, the transition relations are compared. A conventional tableau is a Kripke structure, whereas a destination-node selective tableau according to this embodiment is a sequential machine. Therefore, in this embodiment, atomic proposition is employed as a transition label. Only proposition symbols corresponding to the next time subformulas serve as state variables of the tableau. Thus, it should be taken into account that the properties of the output data are different as well as the methods. Then, the difference between the methods for finding a transition relation is described.

Figure 34:
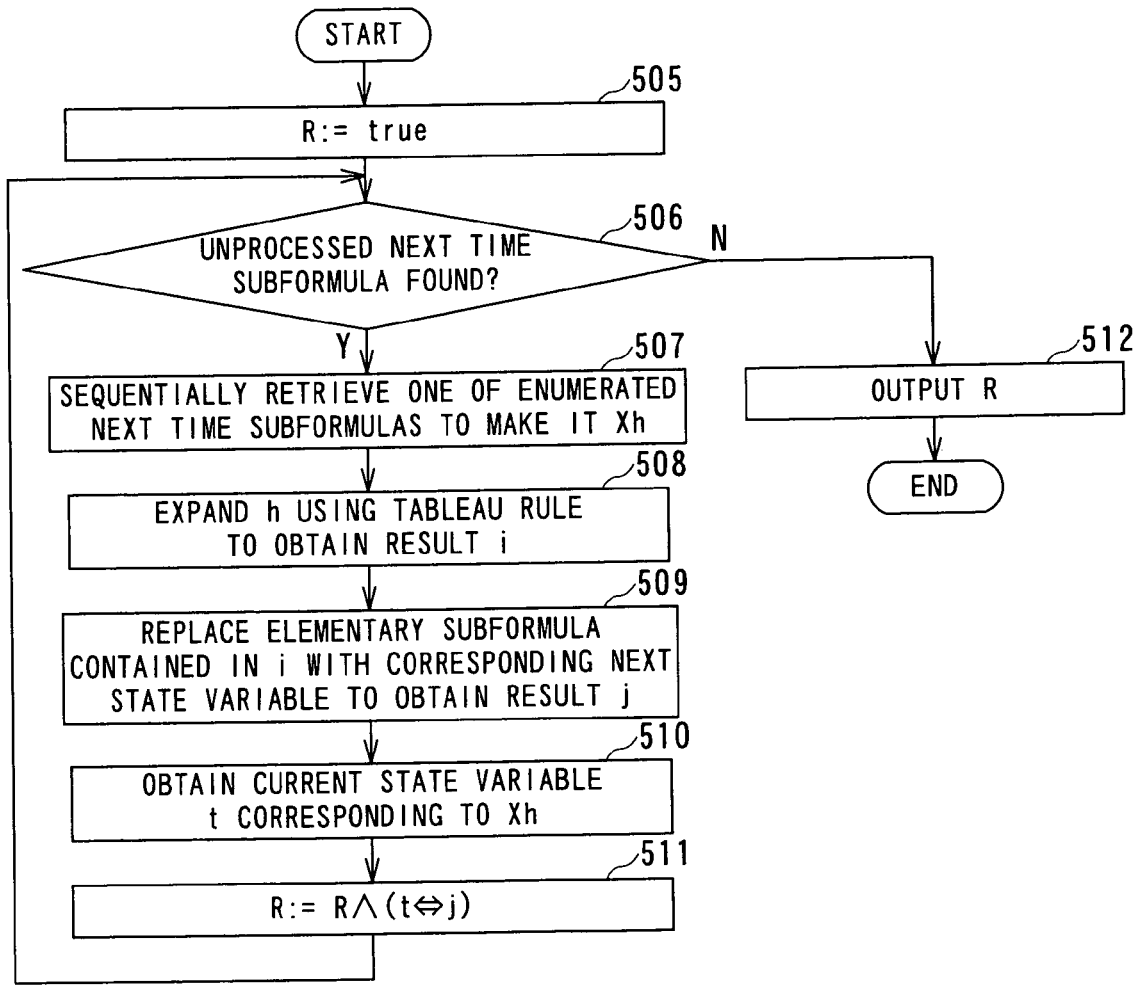
FIG. 34 is a flow chart for finding a transition relation R in a conventional tableau construction method.

FIG. 34 is a flow chart for finding a transition relation R according to a known technology.

At step 505, a variable R is initialized to "true". A transition relation is eventually stored in the variable R. Thereafter, the next time subformulas are sequentially retrieved from the elementary subformulas enumerated at step 503 (see FIG. 32) to be processed. At step 506, it is determined whether all the next time subformulas are processed. If an unprocessed next time subformula is found, that unprocessed next time subformula is selected at step 507. The words "to make it Xh" at step 507 refers to an operation that a first letter "X" is removed from a next time subformula and the remaining portion is considered to be h.

At step 508, the tableau rule is applied to h so as to expand h. At step 509, a elementary subformula contained in the result of expansion is replaced with a next state variable. The result is referred to as "j". At step 510, the current state variable corresponding to the currently processed next time subformula (Xh) is found. The current state variable is referred to as "t". The relation derived from the next time subformula Xh is expressed as follows:

$$t \Leftrightarrow j \quad (13)$$

where t represents the current state variable and j represents a formula including next state variables.

At step 511, the variable R, which maintains the intermediate result of the transition relation, is updated using the above-described result. The above-described steps are repeated until it is determined at step 506 that all the next time subformulas are processed. If all the next time subformulas are processed, R is output at step 512 and the process is completed. This R represents the transition relation according to the known technology.

Figure 35:
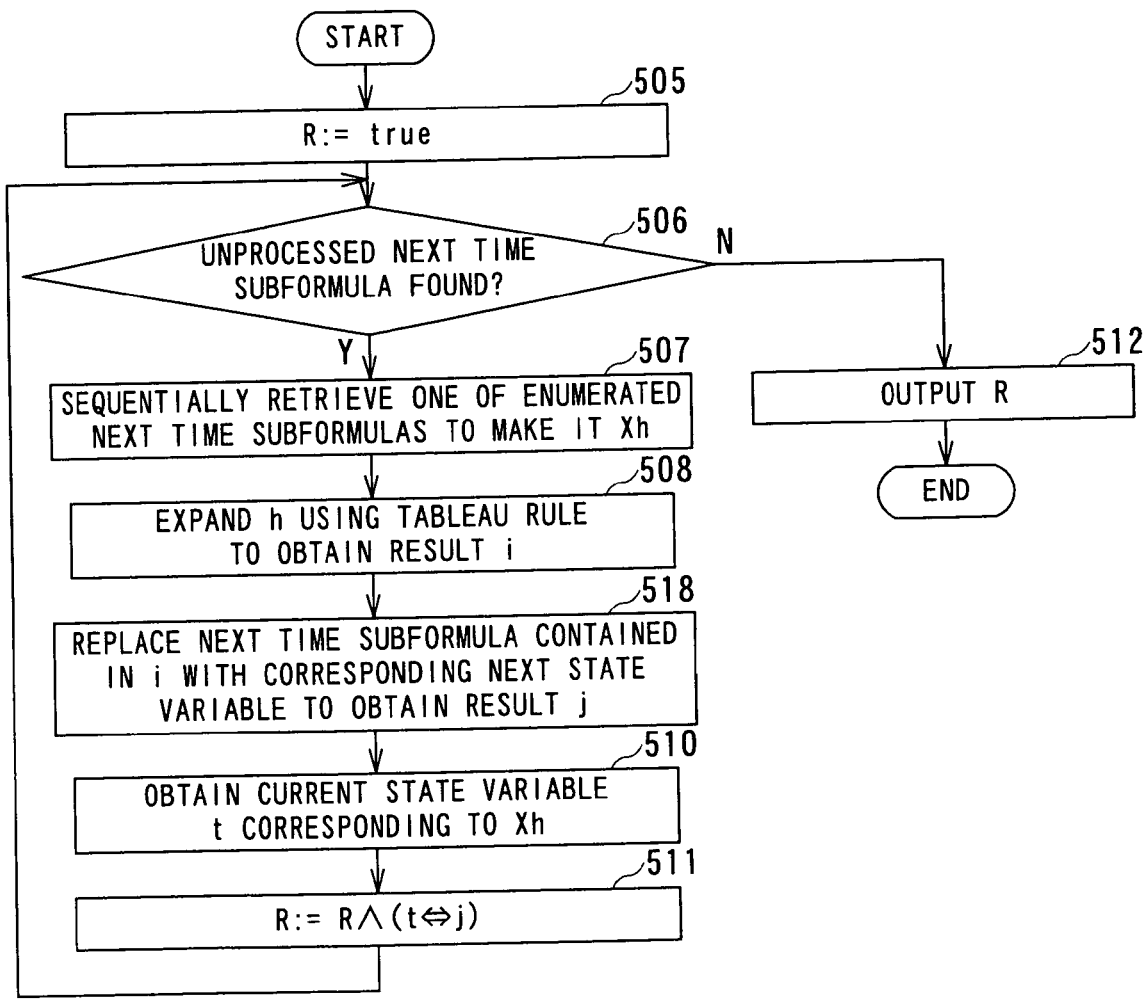
FIG. 35 is a flow chart for finding a transition relation R in a tableau construction method according to the second embodiment.

FIG. 35 is a flow chart of a procedure to find a transition relation of a tableau (destination-node selective tableau) according to this embodiment.

Step 518 of this embodiment corresponds to step 509 in the known technology. The difference is that all the elementary subformulas including an atomic proposition are replaced with the next state variables in the known technology whereas only the next time subformulas are replaced with the next state variables in this embodiment. This difference is caused by manipulating the atomic proposition (corresponding to an input and output signal) as a transition label instead of a state variable.

It is noted that the schemes to find the initial state are the same in the known technology and in this embodiment.

Thus, the destination-node selective tableau generating unit 424 generates a destination-node selective tableau. The destination-node selective tableau obtained here is stored in the control specification model storage unit 406. The operations of the subsequent units (i.e., units other than the control specification (temporal logic) input unit 415 and the control specification model generating unit 416) are the same as those in the first embodiment, and therefore, the descriptions are not repeated.

However, for confirmation, only the intermediate result is illustrated.

By simply composing the control target model M1 shown in FIGS. 10A and 10B and the control specification model M according to the second embodiment shown in FIGS. 30 and 31, the transition table shown in FIG. 36 and a table representing the set of initial states shown in FIG. 37 are obtained as the output of model composing unit 421.

The controllable simulation relation Hmax is illustrated in FIG. 38. This Hmax is obtained from the computing operation of the controllable simulation relation computing unit 407. By extracting the transition relation and the initial states contained in the controllable simulation relation Hmax (see FIG. 38) from the transition table shown in FIG. 36 and a table representing the set of initial states shown in FIG. 37, the permissible operation model Mc is obtained. The transition relation of the permissible operation model Mc is illustrated in FIG. 39 whereas the set of initial states of the permissible operation model Mc is illustrated in FIG. 40. The control rule is illustrated in FIG. 41.

In the specific example of the second embodiment, the extraneous signal v, the control output signal y, and the control input signal u are 1-bit signals. Like the first embodiment, even when these signals are multi-bit signals, the present invention is applicable. The reason why the 1-bit signals are employed in the specific example is to reduce the size of the accompanying drawings.

Furthermore, while this embodiment has been described with reference to an LTL-based control specification, the present invention can be applied to an ACTL-based specification. In Non-Patent Document 3, both the LTL-based tableau construction and the ACTL-based tableau construction are described, and the both are similar to each other. Obviously, a destination-node selective tableau can be generated for ACTL by referencing Non-Patent Document 3 while considering that the calculation X of LTL corresponds to the calculation AX of ACTL and the definition of the transition relation is changed in accordance with the change from X to AX.

Additionally, it should be pointed out that the number of states of the permissible operation model is less than or equal to the multiplication of the number of states of the control target model and the number of states of the control specification model. In terms of the number of state variables, the number of state variables of the permissible operation model is less than or equal to the sum of the number of state variables of the control target model and the number of state variables of the control specification model. The number of state variables of the permissible operation model can be considered to equal to the number of flip-flops when the control apparatus is implemented as a digital circuit. In other words, the scale of the control apparatus can be estimated when the number of states of the control target and the number of next time propositions of the control specification are determined.

In particular, it is advantageous that the upper limit of the number of states of a control apparatus is determined in advance. The upper limit helps to estimate whether calculation of controllable simulation relation is feasible for a computer before the calculation is actually carried out.

As described above, one of the features of this embodiment is that the scale of a digital apparatus can be estimated in advance from a temporal logic-based control specification thereof. Although this embodiment does not describe the connection method of arbiters and schedulers when they are required, the scale of a digital apparatus including arbiters and schedulers can be still estimated in advance since the approximate number of flip-flops contained in an additional circuit can be identified when the connection method is specified.

According to the second embodiment, an automatic design apparatus, an automatic design method, and an automatic design program of a digital circuit can provide an automatic design of a digital circuit even when a model of a specification of a control system (model of a control specification) is provided in the form of a temporal logic instead of a sequential machine. Accordingly, the advantage of representing a control specification in the form of a temporal logic (e.g., the correctness and simplicity) can be provided.

While the invention will be described in conjunction with the preferred embodiments, it will be understood that they are not intended to limit the invention to these embodiments. On the contrary, the invention is intended to be realized by modifying its components within the spirit and scope of the invention as defined by the claims. Additionally, the invention is intended to be realized by combining appropriate components from among a plurality of components disclosed in the preferred embodiments. For example, some of the components may be removed from all the components disclosed in the preferred embodiments. Furthermore, components in a plurality of the preferred embodiments may be appropriately combined.

What is claimed is:

1. An automatic design apparatus for a digital control system circuit including a control target circuit and a control apparatus circuit, the apparatus automatically designing a model of the control apparatus circuit in the case where a model of the control target circuit and a specification model of the digital control system circuit are given, the apparatus comprising:
    a control target input unit configured-to receive a first control target model written in a predetermined design description language, the first control target model being the model of the control target circuit;
    a control target model generating unit configured to generate a second control target model represented by a finite state machine model from the first control target model;
    a control target model storage unit configured to store the generated second control target model;
    a control specification input unit configured to receive at least a first control specification model written in a predetermined design description language, the first control specification model being the specification model of the control system circuit;
    a control specification model generating unit configured to generate a second control specification model represented by a finite state machine model from at least the first control specification model;
    a control specification model storage unit configured to store the second control specification model;
    a model composing unit configured to generate a control apparatus synthesis model by computing a logical AND of the second control target model stored in the control target model storage unit and the second control specification model stored in the control specification model storage unit, the control apparatus synthesis model being a synthesis model of the control apparatus circuit;
    a controllable simulation relation computing unit configured to compute controllable simulation relation representing a constraint condition imposed on the control apparatus synthesis model from the second control target model and the second control specification model;
    a controllable simulation relation storage unit configured to store the computed controllable simulation relation;
    a controllability determining unit configured to determine whether the control apparatus synthesis model is a model capable of providing control for satisfying the specification of the control system circuit on the basis of the controllable simulation relation;
    a permissible operation model generating unit configured to generate a permissible operation model from the control apparatus synthesis model and the controllable simulation relation, the permissible operation model being a model obtained by reducing the scale of the control apparatus synthesis model;
    a permissible operation model storage unit configured to store the generated permissible operation model;
    a control rule determining unit configured to determine a control rule capable of further reducing the scale of the permissible operation model; and
    a control apparatus model generating unit configured to generate a control apparatus model represented by a finite state machine model by computing a logical AND of the permissible operation model and the control rule.

2. The automatic design apparatus according to claim 1, further comprising:
    A converting unit configured to convert the control apparatus model to an executable specification description language.

3. The automatic design apparatus according to claim 1, wherein the control specification input unit further receives a specification model of the control system circuit written in a temporal logic formula, and wherein the control specification model generating unit includes tableau generating unit for converting the received specification model of the control system circuit written in a temporal logic formula to a tableau serving as a model of a finite state machine so as to generate the second control specification model.

4. The automatic design apparatus according to claim 3, wherein the tableau generating unit expands the temporal logic formula into elementary subformulas on the basis of a tableau rule and generates a model of a sequential machine by, in a state transition of a state variable corresponding to the expanded elementary subformula, generating a destination-node selective tableau having an input variable and an output variable contained in a state variable of a destination node as a label value of the state transition.

5. An automatic design apparatus for a digital control system circuit including a control target circuit and a control apparatus circuit, the apparatus automatically designing a model of the control apparatus circuit in the case where a model of the control target circuit and a specification model of the digital control system circuit, the apparatus comprising:
    a control target input unit configured to receive a first control target model written in a predetermined design description language, the first control target model being the model of the control target circuit;
    a control target model generating unit configured to generate a second control target model represented by a finite state machine model from the first control target model;
    a control target model storage unit configured to store the generated second control target model;
    a control specification input unit configured to receive at least a first control specification model written in a predetermined design description language, the first control specification model being the specification model of a control system circuit;
    a control specification model generating unit configured to generate a second control specification model represented by a finite state machine model from at least the first control specification model;

a control specification model storage unit configured to store the second control specification model;

a model composing unit configured to generate a control apparatus synthesis model by computing a logical AND of the second control target model stored in the control target model storage unit and the second control specification model stored in the control specification model storage unit, the control apparatus synthesis model being a synthesis model of the control apparatus circuit;

a controllable simulation relation computing unit configured to compute controllable simulation relation representing a constraint condition imposed on the control apparatus synthesis model from the second control target model and the second control specification model;

a controllable simulation relation storage unit configured to store the computed controllable simulation relation;

a controllability determining unit configured to determine whether the control apparatus synthesis model is a model capable of providing control for satisfying the specification of the control system circuit on the basis of the controllable simulation relation;

a permissible operation model generating unit configured to generate a permissible operation model from the control apparatus synthesis model and the controllable simulation relation, the permissible operation model being a model obtained by reducing the scale of the control apparatus synthesis model;

a permissible operation model storage unit configured to store the generated permissible operation model; and a control apparatus model generating unit configured to generate a control apparatus model represented by a model of a finite state machine on the basis of the permissible operation model.

6. An automatic design method for a digital control system circuit including a control target circuit and a control apparatus circuit, the method automatically designing a model of the control apparatus circuit in the case where a model of the control target circuit and a specification model of the digital control system circuit are given, the method comprising the steps of:

receiving a first control target model written in a predetermined design description language, the first control target model being the model of the control target circuit;

generating a second control target model represented by a finite state machine model from the first control target model;

receiving at least a first control specification model written in a predetermined design description language, the first control specification model being the specification model of the control system circuit;

generating a second control specification model represented by a finite state machine model from at least the first control specification model;

generating a control apparatus synthesis model by computing a logical AND of the second control target model and the second control specification model, the control apparatus synthesis model being a synthesis model of the control apparatus circuit;

computing controllable simulation relation representing a constraint condition imposed on the control apparatus synthesis model from the second control target model and the second control specification model;

determining whether the control apparatus synthesis model is a model capable of providing control for satisfying the specification of the control system circuit on the basis of the controllable simulation relation;

generating a permissible operation model from the control apparatus synthesis model and the controllable simulation relation, the permissible operation model being a model obtained by reducing the scale of the control apparatus synthesis model;

determining a control rule capable of further reducing the scale of the permissible operation model; and generating a control apparatus model represented by a finite state machine model by computing a logical AND of the permissible operation model and the control rule.

7. The automatic design method according to claim 6, further comprising the step of:

converting the control apparatus model to an executable specification description language.

8. The automatic design method according to claim 6, wherein the step of receiving at least a first control specification model further receives a specification model of the control system circuit written in a temporal logic formula, and wherein the step of generating a second control specification model includes the sub-step of converting the received specification model of the control system circuit written in a temporal logic formula to a tableau serving as a model of a finite state machine so as to generate the second control specification model.

9. The automatic design method according to claim 8, wherein the sup-step of converting the received specification model of the control system circuit written in a temporal logic formula to a tableau expands the temporal logic formula into elementary subformulas on the basis of a tableau rule and generates a model of a sequential machine by, in a state transition of a state variable corresponding to the expanded elementary subformula, generating a destination-node selective tableau having an input variable and an output variable contained in a state variable of a destination node as a label value of the state transition.

10. An automatic design program for a digital control system circuit including a control target circuit and a control apparatus circuit, the program automatically designing a model of the control apparatus circuit in the case where a model of the control target circuit and a specification model of the digital control system circuit are given, the program comprising instructions for causing a computer to execute the steps of:

receiving a first control target model written in a predetermined design description language, the first control target model being the model of the control target circuit;

generating a second control target model represented by a finite state machine model from the first control target model;

receiving at least a first control specification model written in a predetermined design description language, the first control specification model being the specification model of the control system circuit;

generating a second control specification model represented by a finite state machine model from at least the first control specification model;

generating a control apparatus synthesis model by computing a logical AND of the second control target model and the second control specification model, the control apparatus synthesis model being a synthesis model of the control apparatus circuit;

computing controllable simulation relation representing a constraint condition imposed on the control apparatus synthesis model from the second control target model and the second control specification model;

determining whether the control apparatus synthesis model is a model capable of providing control for satisfying the specification of the control system circuit on the basis of the controllable simulation relation;

generating a permissible operation model from the control apparatus synthesis model and the controllable simulation relation, the permissible operation model being a model obtained by reducing the scale of the control apparatus synthesis model;

determining a control rule capable of further reducing the scale of the permissible operation model; and generating a control apparatus model represented by a finite state machine model by computing a logical AND of the permissible operation model and the control rule.

11. The automatic design program according to claim 10, further comprising instructions for causing a computer to execute the step of:

converting the control apparatus model to an executable specification description language.

12. The automatic design program according to claim 10, wherein the step of receiving at least a first control specification model further receives a specification model of the control system circuit written in a temporal logic formula, and wherein the step of generating a second control specification model includes the sub-step of converting the received specification model of the control system circuit written in a temporal logic formula to a tableau serving as a model of a finite state machine so as to generate the second control specification model.

13. The automatic design program according to claim 12, wherein the sup-step of converting the received specification model of the control system circuit written in a temporal logic formula to a tableau expands the temporal logic formula into elementary subformulas on the basis of a tableau rule and generates a model of a sequential machine by, in a state transition of a state variable corresponding to the expanded elementary subformula, generating a destination-node selective tableau having an input variable and an output variable contained in a state variable of a destination node as a label value of the state transition.

* * * * *